(12) United States Patent
Sugahara et al.

(10) Patent No.: US 7,650,061 B2
(45) Date of Patent: Jan. 19, 2010

(54) INFORMATION RECORDING APPARATUS, INFORMATION REPRODUCING APPARATUS, AND RELATED COMPUTER PROGRAMS

(75) Inventors: Takayuki Sugahara, Yokosuka (JP); Seiji Higurashi, Fuchu (JP)

(73) Assignee: Victor Company of Japan, Ltd., Yokohama (JP)

( * ) Notice: Subject to any disclaimer, the term of this patent is extended or adjusted under 35 U.S.C. 154(b) by 815 days.

(21) Appl. No.: 11/324,514

(22) Filed: Jan. 4, 2006

(65) Prior Publication Data

US 2006/0159429 A1 Jul. 20, 2006

(30) Foreign Application Priority Data

Jan. 14, 2005 (JP) .............................. 2005-007648
Nov. 16, 2005 (JP) .............................. 2005-331299

(51) Int. Cl.
*H04N 7/00* (2006.01)
*H04N 5/00* (2006.01)
(52) U.S. Cl. ...................................... 386/107; 386/117
(58) Field of Classification Search .................... 386/46, 386/107, 117, 125, 124, 120
See application file for complete search history.

(56) References Cited

U.S. PATENT DOCUMENTS 5,153,730 A * 10/1992 Nagasaki et al. ......... 348/231.6
2008/0317443 A1 * 12/2008 Ando et al. ................. 386/126

FOREIGN PATENT DOCUMENTS

JP 2000-23094 1/2000
JP 2004-72148 3/2004

* cited by examiner

*Primary Examiner*—Robert Chevalier
(74) *Attorney, Agent, or Firm*—Louis Woo

(57) ABSTRACT

Pictures are successively captured, and thereby moving-picture data representing a stream of moving pictures is generated. At least one picture is captured, and thereby still-picture data representing at least one still picture is generated. The still picture corresponds in picture capture timing to first one of the moving pictures. Link information is generated which represents the correspondence in picture capture timing between the still picture and the first one of the moving pictures. Offset information is generated. The offset information designates a second one of the moving pictures which precedes the first one of the moving pictures by a prescribed time interval. Correspondence information is generated which includes a pair of the link information and the offset information. The moving-picture data, the still-picture data, and the correspondence information are recorded on a recording medium.

9 Claims, 20 Drawing Sheets

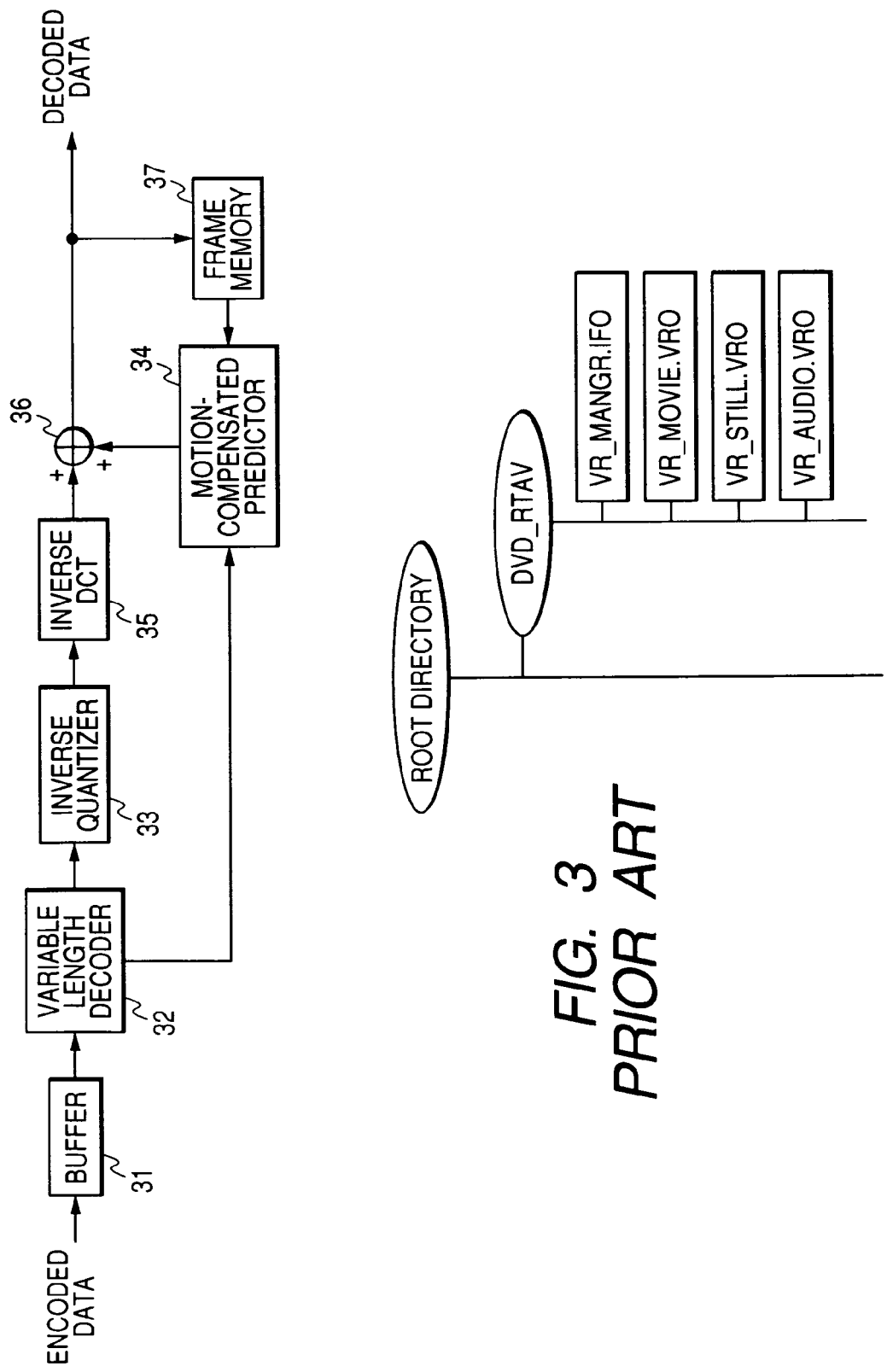

FIG. 6
PRIOR ART

| | | | |
|---|---|---|---|
| PGC_GI | | PG_Ns | PROGRAM NUMBER |
| PGI#i | | Cl_SRP_Ns | Cl_SRP NUMBER |
| | | PG_TY | (OMITTED) |
| | | C_Ns | CELL NUMBER IN PROGRAM |
| | | PRM_TXTI | PRIMARY TEXT INFORMATION |
| | | IT_TXT_SRPN | ITEM TEXT SEARCH POINTER NUMBER |
| | | REP_PICTI | REPRESENTATIVE STILL PICTURE INFORMATION |
| Cl_SRP#j | | Cl_TY | START ADDRESS OF M_Cl#j |
| M_Cl#j | M_C_GI | C_TY | CELL TYPE |
| | | M_VOBI_SRPN | (OMITTED) |
| | | C_EPI_Ns | CELL ENTRY POINT NUMBER |
| | | C_V_S_PTM | (OMITTED) |
| | | C_V_E_PTM | (OMITTED) |
| | M_C_EPI#k | EP_TY | ENTRY POINT TYPE (A OR B) |
| | | EP_PTM | ENTRY POINT PLAYBACK TIME STAMP |
| | | PRM_TXTI | PRIMARY TEXT INFORMATION (TYPE B ONLY) |

FIG. 10

| DATA FIELD | CONTENTS |
|---|---|
| V_PR_IFO_i() { | START OF V_PR_IFO |
| Size of this PR_IFO | SIZE OF PR_IFO |
| PR number (V_PRN) | VIDEO PROGRAM NUMBER |
| Video Group number (V_GRN) | VIDEO GROUP NUMBER RELATED TO PROGRAM |
| reserved | UNUSED |
| Playback Time | PLAYBACK TIME OF PROGRAM |
| Num_of_INDEX | INDEX NUMBER IN PROGRAM |
| Valid Start Address | VALID PLAYBACK START ADDRESS IN PROGRAM |
| Valid End Address | VALID PLAYBACK END ADDRESS IN PROGRAM |
| Rec Date | RECORDING DATE OF PROGRAM |
| Rec Time | RECORDING TIME OF PROGRAM |
| reserved | UNUSED |
| Character Set | CHARACTER SET USED BY PR AND Link text information |
| PR text information_size | SIZE OF PR text information |
| for(i=0; i< PR text information_size; i++) { PR_text_information } | PR text information |
| Link_text_information_size | SIZE OF Link text information |
| for(i=0; i< Link_text information_size; i++) { Link_text_information } | Link text information |
| Content type | CONTENT TYPE |
| Component type | DATA TYPE |
| Content nibble 1 | GENRE TYPE |
| Content nibble 2 | SUB GENRE TYPE |
| V_ATR | VIDEO ATTRIBUTE |
| A_ATR | AUDIO ATTRIBUTE |
| Content ID | CONTENT ID |
| User ID | USER ID |
| Password | PASSWORD |
| Delete_lock | DELETE LOCK FLAG |
| View_lock | PLAYBACK LOCK FLAG |
| reserved | UNUSED |
| } | END OF V_PR_IFO |

| DATA FIELD | CONTENTS |
|---|---|
| V_ATR () { | START OF V_ATR |
| Video_compression_mode | 00=MPEG1  01=MPEG2  10=JPEG  11=PNG |
| TV_system | 00=525/60  01=625/50 |
| Aspect_ratio | 00=4:3  01=16:9 |
| Horizontal_video_resolution | HORIZONTAL-DIRECTION PIXEL NUMBER |
| Vertical_video_resolution | VERTICAL-DIRECTION PIXEL NUMBER |
| } | END OF V_ATR |

FIG. 11

| DATA FIELD | CONTENTS |
|---|---|
| V_PR_IFO_i() { | START OF A_PR_IFO |
| Size of this PR_IFO | SIZE OF PR_IFO |
| PR number (A_PRN) | AUDIO PROGRAM NUMBER |
| Audio Group number (A_GRN) | AUDIO GROUP NUMBER RELATED TO PROGRAM |
| Track number (TKN) | TRACK NUMBER IN GROUP |
| Playback Time | PLAYBACK TIME OF PROGRAM |
| Num_of_INDEX | INDEX NUMBER IN PROGRAM |
| Valid Start Address | VALID START ADDRESS IN PROGRAM |
| Valid End Address | VALID END ADDRESS IN PROGRAM |
| Rec Date | RECORDING DATE OF PROGRAM |
| Rec Time | RECORDING TIME OF PROGRAM |
| reserved | UNUSED |
| Character Set | CHARACTER SET USED BY PR AND Link text information |
| PR text information_size | SIZE OF PR text information |
| for(i=0; i< PR text information_size; i++) { PR_text_information } | PR text information |
| Link_text_information_size | SIZE OF Link text information |
| for(i=0; i< Link_text information_size; i++) { Link_text_information } | Link text information |
| Content type | CONTENT TYPE |
| Component type | DATA TYPE |
| Content nibble 1 | GENRE TYPE |
| Content nibble 2 | SUB GENRE TYPE |
| reserved | UNUSED |
| A_ATR | AUDIO ATTRIBUTE |
| Content ID | CONTENT ID |
| User ID | USER ID |
| Password | PASSWORD |
| Delete_lock | DELETE LOCK FLAG |
| View_lock | PLAYBACK LOCK FLAG |
| reserved | UNUSED |
| } | END OF A_PR_IFO |

FIG. 12

| DATA FIELD | CONTENTS |
|---|---|
| S_PR_IFO_k() { | START OF S_PR_IFO |
| Size of this PR_IFO | SIZE OF PR_IFO |
| PR number (S_PRN) | STILL PICTURE PROGRAM NUMBER |
| Still picture Group number (S_GRN) | STILL PICTURE GROUP NUMBER RELATED TO PROGRAM |
| Linked_video_program_number | PR_number OF LINKED VIDEO |
| Linked_video_entry_time | TIME CODE OF LINKED VIDEO PICTURE |
| entry_offset_time | ENTRY OFFSET TIME FROM TIME CODE OF LINKED VIDEO PICTURE |
| reserved | UNUSED |
| Rec Date | RECORDING DATE OF PROGRAM |
| Rec Time | RECORDING TIME OF PROGRAM |
| reserved | UNUSED |
| Character Set | CHARACTER SET USED BY PR AND Link text information |
| PR text information_size | SIZE OF PR text information |
| for(i=0; i< PR text information_size; i++) { PR_text_information } | PR text information |
| reserved | UNUSED |
| Content type | CONTENT TYPE |
| Component type | DATA TYPE |
| Content nibble 1 | GENRE TYPE |
| Content nibble 2 | SUB GENRE TYPE |
| reserved | UNUSED |
| S_ATR | STILL PICTURE ATTRIBUTE |
| Content ID | CONTENT ID |
| User ID | USER ID |
| Password | PASSWORD |
| Delete_lock | DELETE LOCK FLAG |
| View_lock | PLAYBACK LOCK FLAG |
| reserved | UNUSED |
| } | END OF S_PR_IFO |

| DATA FIELD | CONTENTS |
|---|---|
| S_ATR () { | START OF S_ATR |
| Video_compression_mode | 00=MPEG1  01=MPEG2  10=JPEG  11=PNG |
| TV_system | 00=525/60  01=625/50 |
| Aspect_ratio | 00=4:3    01=16:9 |
| } | END OF S_ATR |

FIG. 13

| DATA FIELD | CONTENTS |
|---|---|
| PL_IFO_p() { | START OF PL_IFO |
| Size of this PL_IFO | SIZE OF PL_IFO |
| PL number | PLAY LIST NUMBER |
| reserved | UNUSED |
| Playback Time | PLAYBACK TIME OF PLAY LIST |
| num_of_ud_programs | USER DEFINED PROGRAM NUMBER IN PLAY LIST |
| for(i=0; i<num_of_ud_programs; j++) { | |
| UD_PR_mode | RECORDED PROGRAM FLAG<br>000b: VIDEO PROGRAM ONLY<br>001b: AUDIO PROGRAM ONLY<br>010b: STILL PICTURE PROGRAM ONLY<br>011b: AUDIO AND STILL PICTURE PROGRAMS<br>OTHERS: UNUSED |
| if(UD_PR_mode == '000b') { | |
| num_of_V_PRs | NUMBER OF PLAYBACK VIDEO PROGRAMS |
| for(t=0; t<num_of_V_PRs; t++) { | |
| PR number | VIDEO PROGRAM NUMBER |
| Start Address | PLAYBACK START ADDRESS |
| End Address | PLAYBACK END ADDRESS |
| } | |
| } | |
| if(UD_PR_mode == '000b' or '011b') { | |
| num_of_A_PRs | NUMBER OF PLAYBACK AUDIO PROGRAMS |
| for(t=0; t<num_of_A_PRs; t++) { | |
| PR number | AUDIO PROGRAM NUMBER |
| Start Address | PLAYBACK START ADDRESS |
| End Address | PLAYBACK END ADDRESS |
| } | |
| } | |
| if(UD_PR_mode == '010b' or '011b') { | |
| num_of_S_PRs | NUMBER OF PLAYBACK STILL PICTURE PROGRAMS |
| Display_mode | STILL PICTURE DISPLAY MODE |
| Display_duration | STILL PICTURE DISPLAY DURATION |
| for(t=0; t<num_of_S_PRs; t++) { | |
| PR number | STILL PICTURE PROGRAM NUMBER |
| } | |
| } | |
| } | |
| Making Date | MAKING DATE OF PLAY LIST |
| Making Time | MAKING TIME OF PLAY LIST |
| reserved | UNUSED |
| Character Set | CHARACTER SET USED BY PL AND Link teext information |
| PL text information_size | SIZE OF PL text information |
| for(i=0; i< PL text information_size; i++)<br>PL_text_information | PL text information |
| Link_text_information_size | SIZE OF Link text information |
| for(i=0; i< Link_text information_size; i++)<br>Link_text_information | Link text information |
| reserved | UNUSED |
| User ID | USER ID |
| Password | PASSWORD |
| Delete_lock | DELETE LOCK FLAG |
| View_lock | PLAYBACK LOCK FLAG |
| reserved | UNUSED |
| } | END OF PL_IFO |

FIG. 14

| DATA FIELD | CONTENTS |
|---|---|
| GENERAL_IFO0 { | START OF GENERAL_IFO |
| System_ID | FORMAT ID |
| Version_num | FORMAT VERSION NUMBER |
| Size of this TOTAL_MAIN_IFO | SIZE OF TOTAL_MAIN_IFO |
| Global_entry_offset | ENTRY OFFSET TIME FROM TIME CODE OF LINKED VIDEO PICTURE |
| CNTNT_IFO Start address | START ADDRESS OF CNTNT_IFO |
| STATUS_IFO Start address | START ADDRESS OF STATUS_IFO |
| } | END OF GENERAL_IFO |

FIG. 18

| SYNTAX | BIT NUMBER |
|---|---|
| Picture () { | |
|     picture_start_code | 32 |
|     Temporal_reference | 10 |
|     picture_coding_type | 3 |
|     vbv_delay | 16 |
|     if ( (picture_coding_type == 2) \|\| | |
|         (picture_coding_type == 3) ) { | |
|         full_pel_forward_vector | 1 |
|         forward_f_code | 3 |
|     } | |
|     if ( picture_coding_type == 3) { | |
|         full_pel_backward_vector | 1 |
|         backward_f_code | 3 |
|     } | |
|     while ( nextbits () == '1' ) { | |
|         extra_bit_picture | 1 |
|         extra_information_picture | 8 |
|     } | |
|     extra_bit_picture | 1 |
|     next_start_code () | |
| | |
|     if (nextbits () == extension_start_code ) { | |
|         extension_start code | 32 |
|         while ( nextbits () != '0000 0000 0000 | |
|             0000 0000 0001' ) { | |
|             Picture_extension_data | 8 |
|         } | |
|         Next_start_code () | |
|     } | |
|     if ( nextbits () == user_data_start_code ) { | |
|         User_data_start code | 32 |
|         While ( nextbits () != '0000 0000 0000 | |
|             0000 0000 0001' ) { | |
|             user_data | 8 |
|         } | |
|         Next_start_code () | |
|     } | |
|     do { | |
|         Slice () | |
|     } while ( nextbits () == slice_start_code ) | |
| } | | ed moving-picture stream is sampled and is then compressed on
INFORMATION RECORDING APPARATUS, INFORMATION REPRODUCING APPARATUS, AND RELATED COMPUTER PROGRAMS

BACKGROUND OF THE INVENTION

1. Field of the Invention

This invention generally relates to an information recording apparatus, an information reproducing apparatus, an information recording method, an information reproducing method, and computer programs related thereto. This invention particularly relates to a method and an apparatus for recording information representative of moving pictures and at least one still picture on a recording medium in such a manner as to allow a search for a desired scene in a moving-picture stream to be conducted during playback, a method and an apparatus for reproducing information representative of moving pictures and at least one still picture from a recording medium and searching a moving-picture stream for a desired scene, and computer programs related thereto.

2. Description of the Related Art

Japanese patent application publication number 2004-72148 discloses an audio-visual data recording apparatus including a prism, a first CCD device for capturing low-resolution moving pictures, and a second CCD device for capturing high-resolution still pictures. The prism splits an incoming light beam into two beams applied to the first and second CCD devices respectively. The first CCD device generates a video signal representing a stream of moving pictures. The second CCD device generates a video signal representing an updatable still picture. The moving-picture signal is compressed according to the MPEG standards. The still-picture signal is compressed according to the JPEG standards. The compressed moving-picture signal and the compressed still-picture signal are simultaneously recorded on a common memory card.

Japanese patent application publication number 2000-23094 discloses an information recording apparatus designed to record data representative of a stream of moving pictures and data representative of a still picture or pictures on a magneto-optical disc. In the apparatus of Japanese application 2000-23094, input data representing a stream of moving pictures is compressed on an MPEG basis to generate compressed moving-picture data. When an operation button issues a still-picture capturing signal, a corresponding time segment of the input data which represents one picture in the moving-picture stream is sampled and is then compressed on a JPEG basis to generate compressed still-picture data. Thus, the picture represented by the sampled time segment of the input data is used as a still picture represented by the compressed still-picture data. The compressed moving-picture data and the compressed still-picture data are recorded on the magneto-optical disc in synchronism with a sync signal.

In a picture search system applied to the case where data representative of a stream of moving pictures and data representative of still pictures corresponding to selected ones of the moving pictures are recorded on a common recording medium, information representing the time position of each recorded still picture is used as search position information (an entry point) for a picture or a frame in the recoded moving-picture stream. Generally, it is difficult to effectively conduct a search for a desired picture in a recorded moving-picture steam in response to only such search position information.

In the case where a recorded still picture is used as an index picture and a search is conducted while the time position of the index picture (the still picture) is defined as an entry point for a picture in a recorded moving-picture stream, playback is immediately started from the picture corresponding to the entry point. Sometimes, there is the occasion for a user's decision to capture a still picture. In this case, the occasion precedes the moment of the capture of the still picture. In other words, a picture or pictures in a recorded moving-picture stream which shows the occasion precede the moment of the capture of the still picture. As previously mentioned, the moment of the capture of the still picture is defined as an entry point, and a search causes playback to be immediately started from the picture corresponding to the entry point. Therefore, the picture or pictures showing the occasion are not played back during the search. Thus, in this case, it is difficult to meet a user's request to see the picture or pictures showing the occasion. In order to find the picture or pictures showing the occasion, it is necessary for the user to slightly move back the playback start position and then perform the playback after the conduct of the search.

SUMMARY OF THE INVENTION

It is a first object of this invention to provide an improved apparatus for recording information representative of moving pictures and at least one still picture on a recording medium in such a manner as to allow the playback of a picture or pictures showing the occasion for a user's decision to capture the still picture during a search.

It is a second object of this invention to provide an improved apparatus for reproducing information representative of moving pictures and at least one still picture from a recording medium which allows the playback of a picture or pictures showing the occasion for a user's decision to capture the still picture during a search.

It is a third object of this invention to provide an improved computer program for recording information representative of moving pictures and at least one still picture on a recording medium in such a manner as to allow the playback of a picture or pictures showing the occasion for a user's decision to capture the still picture during a search.

It is a fourth object of this invention to provide an improved computer program for reproducing information representative of moving pictures and at least one still picture from a recording medium which allows the playback of a picture or pictures showing the occasion for a user's decision to capture the still picture during a search.

It is a fifth object of this invention to provide an improved method of recording information representative of moving pictures and at least one still picture on a recording medium in such a manner as to allow the playback of a picture or pictures showing the occasion for a user's decision to capture the still picture during a search.

It is a sixth object of this invention to provide an improved method of reproducing information representative of moving pictures and at least one still picture from a recording medium which allows the playback of a picture or pictures showing the occasion for a user's decision to capture the still picture during a search.

A first aspect of this invention provides an information recording apparatus comprising first means for successively capturing pictures and thereby generating moving-picture data representing a stream of moving pictures; second means for capturing at least one picture and thereby generating still-picture data representing at least one still picture corresponding in picture capture timing to first one of the moving pictures; third means for generating link information representing the correspondence in picture capture timing between the still picture and the first one of the moving pictures; fourth means for generating offset information designating a second one of the moving pictures which precedes the first one of the moving pictures by a prescribed time interval; fifth means for generating correspondence information including a pair of the link information generated by the third means and the offset information generated by the fourth means; and sixth means for recording the moving-picture data generated by the first means, the still-picture data generated by the third means, and the correspondence information generated by the fifth means on a recording medium.

A second aspect of this invention provides an information reproducing apparatus for reproducing moving-picture data, still-picture information, and correspondence information from a recording medium which have been recoded by the information recording apparatus of the first aspect of this invention. The information reproducing apparatus comprises first means for reading out the still-picture data from the recording medium; second means for processing the still-picture data read out by the first means into index-picture data representing at least one index picture which originates from a still picture represented by the still-picture data; third means for reading out the correspondence information from the recording medium; fourth means for identifying first one of moving pictures represented by the moving-picture data recorded on the recording medium in response to link information in the correspondence information read out by the third means, wherein the first one of the moving pictures is linked with the still picture from which the index picture originates; and fifth means for finding second one of the moving pictures in response to offset information in the correspondence information read out by the third means, wherein the second one of the moving pictures precedes the first one of the moving pictures by a prescribed time interval.

A third aspect of this invention is based on the second aspect thereof, and provides an information reproducing apparatus further comprising sixth means for generating new offset information designating a third one of the moving pictures which precedes the first one of the moving pictures and which differs from the second one of the moving pictures; and seventh means for writing the new offset information generated by the sixth means over the old offset information in the correspondence information in the recording medium for updating.

A fourth aspect of this invention provides a computer program for enabling a computer and its peripheral devices to have the functions of successively capturing pictures and thereby generating moving-picture data representing a stream of moving pictures; capturing at least one picture and thereby generating still-picture data representing at least one still picture corresponding in picture capture timing to first one of the moving pictures; generating link information representing the correspondence in picture capture timing between the still picture and the first one of the moving pictures; generating offset information designating a second one of the moving pictures which precedes the first one of the moving pictures by a prescribed time interval; generating correspondence information including a pair of the generated link information and the generated offset information; and recording the generated moving-picture data, the generated still-picture data, and the generated correspondence information on a recording medium.

A fifth aspect of this invention provides a computer program for enabling a computer and its peripheral devices to have the functions of reading out still-picture data from a recording medium; processing the read-out still-picture data into index-picture data representing at least one index picture which originates from a still picture represented by the read-out still-picture data; reading out correspondence information from the recording medium; identifying first one of moving pictures represented by moving-picture data recorded on the recording medium in response to link information in the read-out correspondence information, wherein the first one of the moving pictures is linked with the still picture from which the index picture originates; and finding second one of the moving pictures in response to offset information in the read-out correspondence information, wherein the second one of the moving pictures precedes the first one of the moving pictures by a prescribed time interval.

A sixth aspect of this invention is based on the fifth aspect thereof, and provides a computer program for enabling a computer and its peripheral devices to further have the functions of generating new offset information designating a third one of the moving pictures which precedes the first one of the moving pictures and which differs from the second one of the moving pictures; and writing the generated new offset information over the old offset information in the correspondence information in the recording medium for updating.

A seventh aspect of this invention provides a method comprising the steps of successively capturing pictures and thereby generating moving-picture data representing a stream of moving pictures; capturing at least one picture and thereby generating still-picture data representing at least one still picture corresponding in picture capture timing to first one of the moving pictures; generating link information representing the correspondence in picture capture timing between the still picture and the first one of the moving pictures; generating offset information designating a second one of the moving pictures which precedes the first one of the moving pictures by a prescribed time interval; generating correspondence information including a pair of the generated link information and the generated offset information; and recording the generated moving-picture data, the generated still-picture data, and the generated correspondence information on a recording medium.

An eighth aspect of this invention provides a method comprising the steps of reading out still-picture data from a recording medium; processing the read-out still-picture data into index-picture data representing at least one index picture which originates from a still picture represented by the read-out still-picture data; reading out correspondence information from the recording medium; identifying first one of moving pictures represented by moving-picture data recorded on the recording medium in response to link information in the read-out correspondence information, wherein the first one of the moving pictures is linked with the still picture from which the index picture originates; and finding second one of the moving pictures in response to offset information in the read-out correspondence information, wherein the second one of the moving pictures precedes the first one of the moving pictures by a prescribed time interval.

A ninth aspect of this invention is based on the eighth aspect thereof, and provides a method further comprising the steps of generating new offset information designating a third one of the moving pictures which precedes the first one of the moving pictures and which differs from the second one of the moving pictures; and writing the generated new offset information over the old offset information in the correspondence information in the recording medium for updating.

This invention has advantages as follows. The recorded data in the recording medium includes the data representing a stream of moving pictures, the data representing a still picture or pictures, and the offset information. The offset information represents the time position of an entry point which precedes the time position of a moving-picture frame equal or similar in capture timing to each of the still pictures. Therefore, in the case where a search for the entry point in the moving-picture stream is carried out while the related still picture is used as an index picture, the playback of the moving-picture stream is started from a time position before the time position of the related still picture. The interval between the time position of the entry point and the time position of the related moving-picture frame is referred to as the offset time concerning the related still picture. The offset information can be set to provide a same offset time concerning all the still pictures. Alternatively, the offset information can be set to provide different offset times concerning the respective still pictures. In order to find a picture or pictures showing the occasion for a user's decision to capture the still picture, it is unnecessary for the user to move back the playback start position and then perform the playback after the conduct of the search.

BRIEF DESCRIPTION OF THE DRAWINGS

FIG. 2 is a block diagram of a prior-art apparatus for decoding a moving-picture bit stream generated by the prior-art apparatus of FIG. 1.

FIG. 3 is a diagram of a prior-art directory and file structure on a DVD-RW or a DVD-RAM.

FIG. 6 is a diagram showing the contents of prior-art program chain information (PGCI) described in the original PGC or the user defined PGC.

FIG. 10 is a table showing an example of the data field and the contents of a moving-picture program information structural body V_PR_IFO_i.

FIG. 11 is a table showing an example of the data field and the contents of an audio program information structural body A_PR_IFO_j.

FIG. 12 is a table showing an example of the data field and the contents of a still-picture program information structural body S_PR_IFO_k.

FIG. 13 is a table showing an example of the data field and the contents of a play list information structural body PL_IFO_p.

FIG. 14 is a table showing an example of the contents of GENERAL_IFO in FIG. 9.

FIG. 18 is a table showing the syntax of one picture in an MPEG-2 video layer.

DETAILED DESCRIPTION OF THE INVENTION

Prior-art apparatuses and recording mediums will be explained below for a better understanding of this invention.

MPEG-2 (Moving Picture Experts Group Phase 2) means international standards for a technique of efficiently encoding a moving-picture signal. The MPEG-2 standards prescribe motion-compensated prediction and transform-based encoding which allow data compression.

Figure 1:
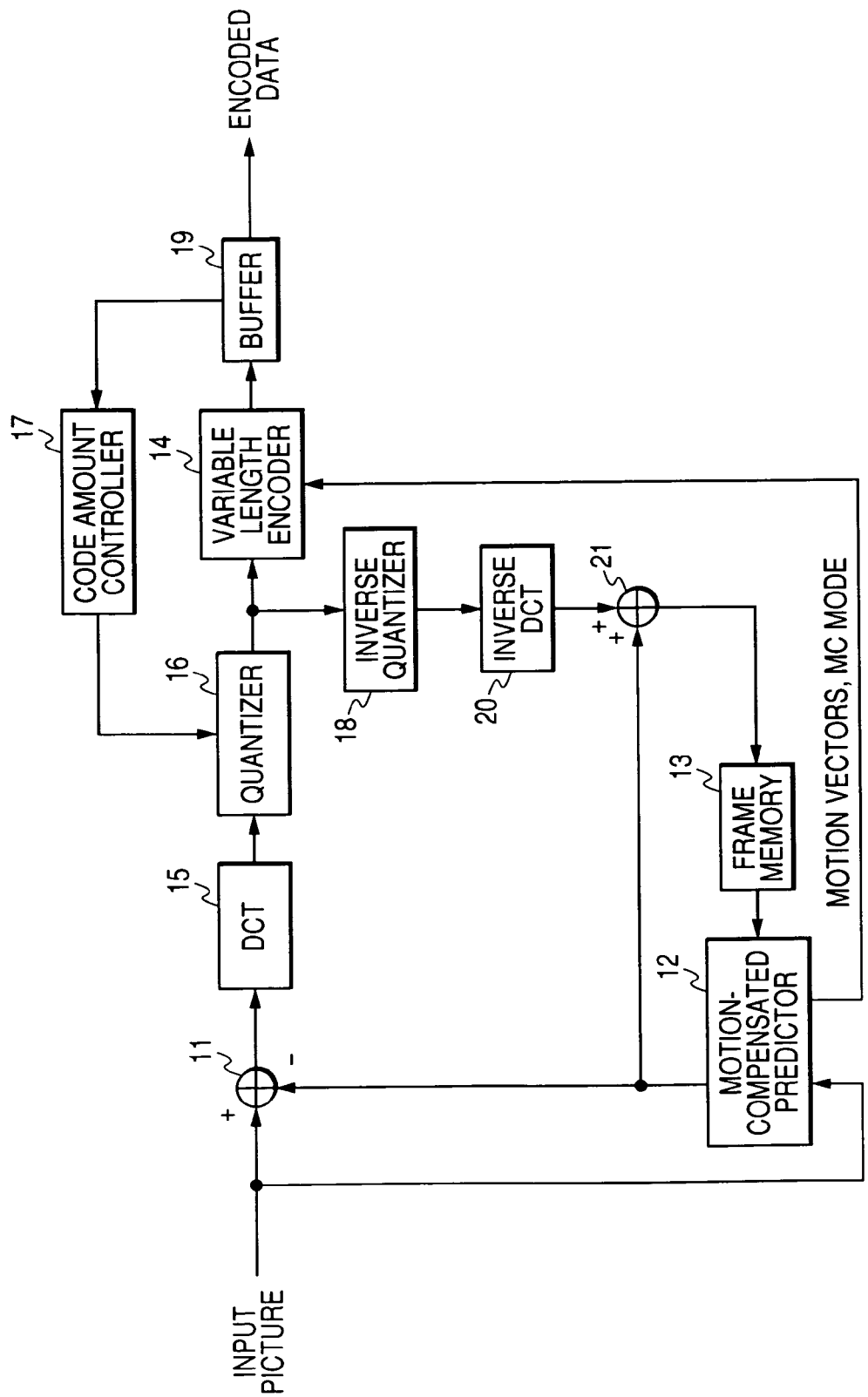
FIG. 1 is a block diagram of a prior-art apparatus for encoding a moving-picture signal in conformity with the MPEG-2 standards.

FIG. 1 shows a prior-art apparatus for encoding a moving-picture signal in conformity with the MPEG-2 standards. Every frame related to an input moving-picture signal is divided into macroblocks of 16 pixels by 16 pixels. The prior-art apparatus of FIG. 1 processes the input moving-picture signal on a macroblock-by-macroblock basis.

The input moving-picture signal represents a stream of pictures of three different types which include I pictures (intra-coded pictures), P pictures (forward predictive coded pictures), and B pictures (bidirectionally predictive coded pictures). Normally, one GOP (group of pictures) starts from an I picture and ends at a picture immediately preceding a next I picture. Generally, one GOP has about 15 pictures. Preferably, the order in which pictures are arranged is changed from the original to allow a proper encoding procedure including bidirectional prediction.

The prior-art apparatus of FIG. 1 operates as follows. A subtracter 11 subtracts a predictive picture from an input picture represented by the input moving-picture signal, and thereby generates a predictive error picture. The predictive picture is fed from a motion-compensated predictor 12. Prediction implemented by the prior-art apparatus of FIG. 1 is in a direction which can change among three modes, that is, a direction from the past, a direction from the future, and a direction from both the past and the future. One of the prediction modes can be selected and used for each macroblock of the input moving-picture signal. The used prediction direction is decided by the type of the input picture. Every macroblock of an input P picture undergoes one of two modes of encoding, that is, (1) encoding with prediction from the past and (2) intra-macroblock encoding without prediction. Every macroblock of an input B picture undergoes one of four modes of encoding, that is, (1) encoding with prediction from the future, (2) encoding with prediction from the past, (3) encoding with prediction from both the past and the future, and (4) intra-macroblock encoding without prediction. On the other hand, every macroblock of an input I picture undergoes intra-macroblock encoding without prediction.

The motion-compensated predictor 12 implements motion compensation for the input picture relative to a reference picture fed from a frame memory 13. The motion compensation includes a step of performing pattern matching between the macroblocks of the input picture and the macroblocks of the reference picture, a step of detecting motion vectors (motion amounts) at a half-pel precision in response to the results of the pattern matching, and a step of shifting one or ones of the macroblocks by the detected motion amounts to convert the reference picture into the predictive picture. The motion vectors are in a horizontal direction and a vertical direction. The motion-compensated predictor 12 notifies the motion vectors and an MC (motion compensation) mode to a variable-length encoder 14. The MC mode indicates where the implemented prediction is from. The motion vectors and the MC mode will be transmitted as additional information with respect to the present macroblock.

A DCT (discrete cosine transform) device 15 receives the predictive error picture from the subtracter 11. The DCT device 15 divides every macroblock of the predictive error picture into four sub-blocks of 8 pixels by 8 pixels. The DCT device 15 subjects each sub-block to two-dimensional discrete cosine transform, thereby generating DCT coefficients. The DCT device 15 outputs the DCT coefficients to a quantizer 16.

The device 16 quantizes the DCT coefficients in response to a quantization scale factor to get quantized DCT coefficients. The quantization scale factor depends on a code amount error notified by a code amount controller 17. Specifically, the quantizer 16 uses a quantization matrix of 8 by 8 elements resulting from weighting two-dimensional 8-by-8 frequencies in accordance with visual sensation. The quantizer 16 multiplies the quantization matrix by the quantization scale factor to get quantization values. Then, the quantizer 16 divides the DCT coefficients by the quantization values to get the quantized DCT coefficients. The quantizer 14 outputs the quantized DCT coefficients to the variable-length encoder 14 and an inverse quantizer 18.

The variable-length encoder 14 converts the quantized DCT coefficients, the motion vectors, and the MC mode into words of a prescribed variable-length code. Specifically, the variable-length encoder 14 uses DPCM (differential pulse code modulation) for the DC (direct current) component in the quantized DCT coefficients. The variable-length encoder 14 scans the two-dimensional array of the AC (alternating current) components in the quantized DCT coefficients along a zigzag path from a low frequency to a high frequency, and implements the Huffman encoding of the scanned AC components. The variable-length encoder 14 sequentially outputs the variable-length code words to a buffer 19. The buffer 19 temporarily stores the variable-length code words before sequentially outputting them in properly-adjusted time base as an output bit stream (output encoded data).

The buffer 19 notifies the code amount controller 17 of the actual amount (the number of bits) of the encoded data outputted from the variable-length encoder 14 for every macroblock. The code amount controller 17 calculates an error between the actual code amount and a target code amount. The code amount controller 17 notifies the calculated code amount error to the quantizer 16. The quantizer 16 adjusts the used quantization scale factor in response to the code amount error so that code amount control will be carried out.

For every input I or P picture, the inverse quantizer 18 and an inverse DCT device 20 cooperate to implement local decoding. Specifically, the device 18 inversely quantizes the quantized DCT coefficients to recover the original DCT coefficients. The inverse quantizer 18 outputs the recovered DCT coefficients to the inverse DCT device 20. The device 20 subjects the recovered DCT coefficients to inverse discrete cosine transform, thereby recovering each original sub-block. The inverse DCT device 20 combines four recovered sub-blocks into each macroblock of a decoded predictive error picture. The inverse DCT device 20 outputs the decoded predictive error picture to an adder 21. The adder 21 receives the predictive picture from the motion-compensated predictor 12. The device 21 adds the decoded predictive error picture and the predictive picture to generate a local decoded picture. The adder 21 outputs the local decoded picture to the frame memory 13. The frame memory 13 temporarily stores the local decoded picture as a reference picture consisting of a local decoded I or P picture. The frame memory 13 feeds the reference picture to the motion-compensated predictor 12.

FIG. 2 shows a prior-art apparatus for decoding a moving-picture bit stream generated by the prior-art apparatus of FIG. 1. The prior-art apparatus of FIG. 2 operates as follows. An input moving-picture bit stream is buffered by a buffer 31 before being fed to a variable-length decoder 32. Basically, the variable-length decoder 32 and following devices carry out signal processing on a macroblock-by-macroblock basis.

The device 32 implements the variable-length decoding of the input moving-picture bit stream to recover quantized DCT coefficients, motion vectors, and an MC mode for every macroblock. The quantized DCT coefficients consist of a DC component and AC components. The variable-length decoder 32 places the AC components in an 8-by-8 matrix along a zigzag order from a low frequency to a high frequency. The variable-length decoder 32 outputs the quantized DCT coefficients to an inverse quantizer 33. The variable-length decoder 32 notifies the motion vectors and the MC mode to a motion-compensated predictor 34.

The device 33 inversely quantizes the quantized DCT coefficients in response to a quantization matrix to recover the original DCT coefficients. The inverse quantizer 33 outputs the recovered DCT coefficients to an inverse DCT device 35. The device 35 subjects the recovered DCT coefficients to inverse discrete cosine transform, thereby recovering each original sub-block. The inverse DCT device 35 combines four recovered sub-blocks into each macroblock of a decoded predictive error picture. The inverse DCT device 35 outputs the decoded predictive error picture to an adder 36.

The adder 36 receives a predictive picture from the motion-compensated predictor 34. The device 36 adds the decoded predictive error picture and the predictive picture to generate a decoded picture. The adder 36 outputs the decoded picture to an external device as decoded data. In the case where the decoded picture is an I or P picture, the adder 36 outputs the decoded picture to a frame memory 37. The frame memory 37 temporarily stores the decoded picture as a reference picture consisting of a decoded I or P picture. The frame memory 37 feeds the reference picture to the motion-compensated predictor 34. The motion-compensation predictor 34 generates the predictive picture from the reference picture in response to the motion vectors and the MC mode.

DVDs (digital versatile discs) are of various types such as a DVD-ROM, a DVD-RW, and a DVD-RAM. There are DVD video recording (DVD-VR) standards for recording moving-picture data on a DVD-RW or a DVD-RAM. The DVD-VR standards prescribe that the recording of the moving-picture data should be on a VOB-by-VOB basis. The VOB means a video object that is a unit file containing moving-picture data. A moving-picture stream can be divided into arbitrary time portions to which VOBs are assigned respectively. The VOBs enable the time portions of the moving-picture stream to be discriminated from each other.

A program chain (PGC) is used to reproduce recorded VOBs from a disc. The PGC describes the sequence of playback of the VOBs. A DVD player refers to the PGC and successively reproduces the VOBs in the described playback sequence.

An original PGC describes the sequence of playback of all VOBs in a disc which agrees with the order in which the VOBs have been recorded. A user defined PGC describes the sequence of playback of ones selected from all VOBs in a disc by a user.

Only one original PGC exists on a disc while a plurality of user defined PGCs can exist thereon. Accordingly, even when there are plural users for one disc, different user defined PGCs are made by the respective users and thereby the disc can be properly edited. Regarding a disc, one user can make different user defined PGCs according to a user's preference to edit the disc.

FIG. 3 shows a prior-art directory and file structure on a DVD-RW or a DVD-RAM according to the DVD-VR standards. As shown in FIG. 3, a DVD_RTAV directory exists under a root directory. A VR_MANGR.IFO file located under the DVD_RTAV directory is used for storing all recording and playback management data. An original PGC and user defined PGCs are described in the VR_MANGR.IFO file. A VR_MOVIE.VRO file, a VR_STILL.VRO file, and a VR_AUDIO.VRO file are also located under the DVD_RTAV directory. The VR_MOVIE.VRO file is loaded with the main body of moving-picture data. The VR_STILL.VRO file is loaded with the main body of still-picture data. The VR_AUDIO.VRO file is loaded with the main body of audio data.

In such a way, real data (moving-picture data, still-picture data, and audio data) and recording and playback management data are recorded on a disc while they are separate from each other. This design allows an arbitrary sequence of playback of VOBs to be set according to a user defined PGC without changing the real moving-picture, still-picture, and audio data.

Generally, still pictures represented by data in the VR_STILL.VRO file are MPEG intra-coded pictures.

Figure 4:
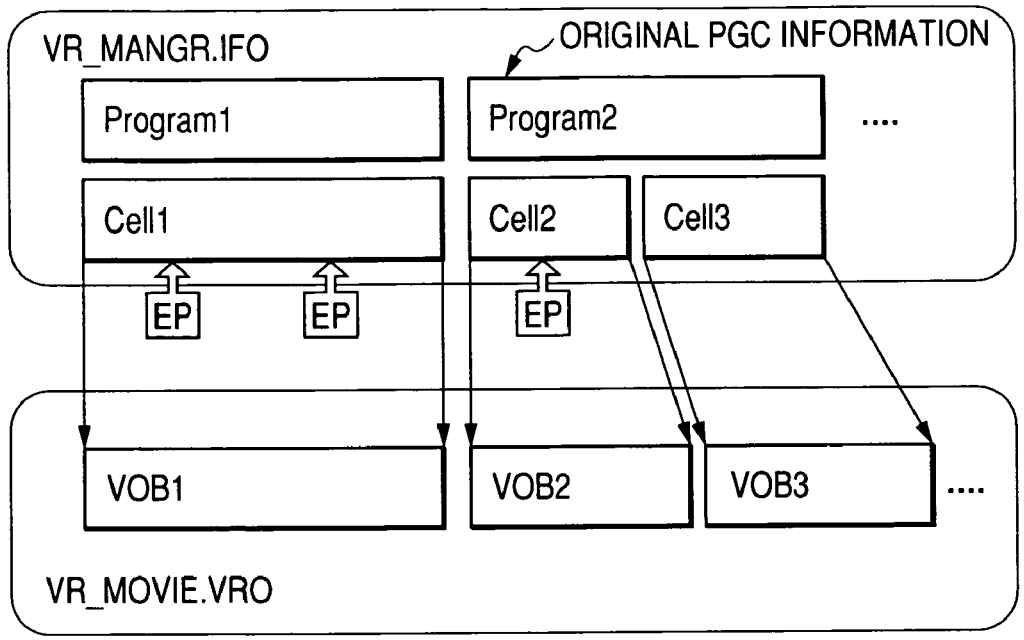
FIG. 4 is a diagram of a structure of a prior-art original PGC.

FIG. 4 shows a structure of a prior-art original PGC. A DVD conforming with the DVD-VR standards is referred to as a DVD-VR. When moving-picture data representing different sequences of moving pictures is recorded on a DVD-VR, programs for referring to portions of the recorded moving-picture data which correspond to the respective moving-picture sequences are described in the original PGC. Furthermore, regarding each of the programs, cells for dividing the moving-picture data corresponding to the present program are described in the original PGC while being related with the present program. Generally, in the case where a pause is taken during the recording or in the case where an editing process after the recording deletes a recorded data portion corresponding to a midway part of a program, divided cells are created and the boundary therebetween coincides with the position of the pause or the deletion. The cells refer to VOBs having the corresponding divided portions of the moving-picture data, respectively. The programs and the cells are recording and playback management data concerning the original PGC.

VOBs have respective portions of moving-picture data which are referred to by cells. The VOBs are recorded as a program stream conforming with the MPEG-2 system standards.

With reference to FIG. 4, moving-picture data which is first recorded on the disc forms a VOB "1". A program "1" and a cell "1" which refer to the VOB 1 are described in the original PGC. Thereafter, each time a VOB is additionally recorded, a program and a cell (a program "2", a program "3", . . . , a cell "1", a cell "2", . . . ) which refer to the VOB are described in the original PGC. In the case where a pause is taken during the recording of one program, a plurality of divided VOBs are formed and thus a plurality of cells referring to the divided cells are described in the program. In FIG. 4, the program "2" is divided into portions corresponding to cells "2" and "3" which refer to VOBs "2" and "3" respectively.

According to the original PGC, all VOBs corresponding to all the programs or the cells described therein (that is, all the programs or the cells stored in the disc) can be played back in the sequence which agrees with the order in which the VOBs have been recorded. When a user designates a specified program on the original PGC, only VOBs the designated program refers to can be played back.

Figure 5:
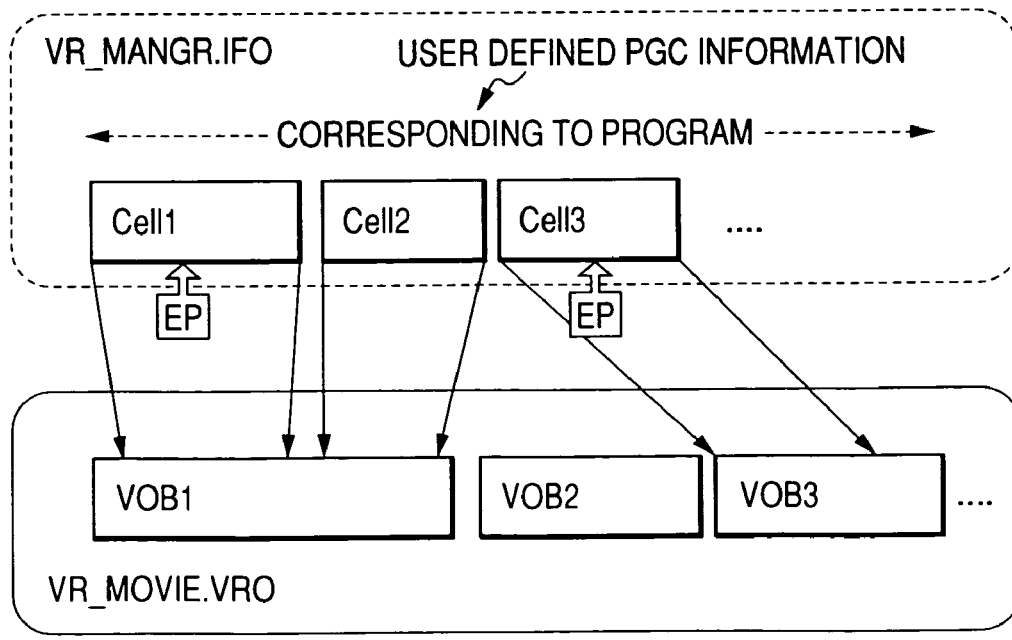
FIG. 5 is a diagram of a structure of a prior-art user defined PGC.

FIG. 5 shows a structure of a prior-art user defined PGC. In general, the user defined PGC can refer to ones or all of VOBs the original PGC refers to. Each cell in the user defined PGC is in or out of one-to-one correspondence with a VOB, and can refer to only a portion of a VOB or at least portions of two successive VOBs. For example, the cell is suited to refer to only a desired-scene-indicating portion of a VOB which is generated by deleting an undesired-scene-indicating portion or a commercial-indicating portion therefrom. The cell is also suited for the playback of a combination of portions of two or more different programs.

A layer corresponding to programs is absent from the user defined PGC. In other words, one user defined PGC corresponds to one program stated by the original PGC.

FIG. 6 shows the contents of prior-art program chain information (PGCI) described in an original PGC or a user defined PGC. The PGCI consists of the following pieces:

PGC_GI: general information about the present PGC;
PGI: program information corresponding to each program ID number (defined for the original PGC only, not defined for the user defined PGC);
CI_SRP: search pointer for each cell information piece in the present PGC; and
M_CI: each cell information piece in the case of moving-picture cells (replaced by S_CI in the case of still-picture cells).

The PGC_GI has PG_Ns indicating the number of programs in the present PGC, and CI_SRP_Ns indicating the number of CI_SRP. In the case of the user defined PGC, the layer corresponding to programs is absent and hence the PG_Ns is set to "0".

There are PGIs, the number of which is equal to that indicated by the PG_Ns. The PGIs are discriminated from each other by a variable number (integer) "i" suffixed to each of them. Each PGI has C_Ns indicating the number of cells in the related program, PRM_TXTI representing primary text information about the related program, IT_TXT_SRPN indicating a search pointer number for item text information (recorded as a data structure in the VR_MANGR.IFO which differs from the PGCI) concerning the related program, and REP_PICTI indicating representative still-picture information for designating the position of a still picture typical of the related program.

There are CI_SRPs, the number of which is equal to the number indicated by the CI_SRP_Ns. The CI_SRPs are discriminated from each other by a variable number (integer) "j" suffixed to each of them. Each CI_SRP has CI_SA indicating the start address of cell information M_CI (S_CI in the case of still pictures).

There are M_CIs, the number of which is equal to the cell number indicated by the C_Ns. Each M_CI has M_C_GI representing general information about the related cell, and M_C_EPI representing cell entry point information. The M_C_EPI may be omitted from the M_CI.

The M_C_GI has C_TY representing the type of the related cell, and C_EPI_Ns indicating the number of cell entry points.

There are M_C_EPIs, the number of which is equal to the cell entry point number indicated by the C_EPI_Ns. The M_C_EPIs are discriminated from each other by a variable number (integer) "k" suffixed to each of them. Each M_C_EPI has EP_TY representing the type of the related entry point, EP_PTM representing the playback time position of the related entry point, and PRM_TXTI representing primary text information concerning the related entry point.

Each entry point is information for designating an arbitrary moment (time position) in the related cell and allowing an access to an arbitrary intermediate point in the related cell or program. In FIGS. 4 and 5, entry points defined in cells are denoted by the arrows EP.

In the case of the playback of a cell related to still pictures, the S_CI is used instead of the M_CI. When moving-picture data and still-picture data are recorded regarding an original PGC, they are mixed on a cell-by-cell basis. On a user defined PGC, there can be a mixture of cells related to moving-picture data and cells related to still-picture data.

First Embodiment

Figure 7:
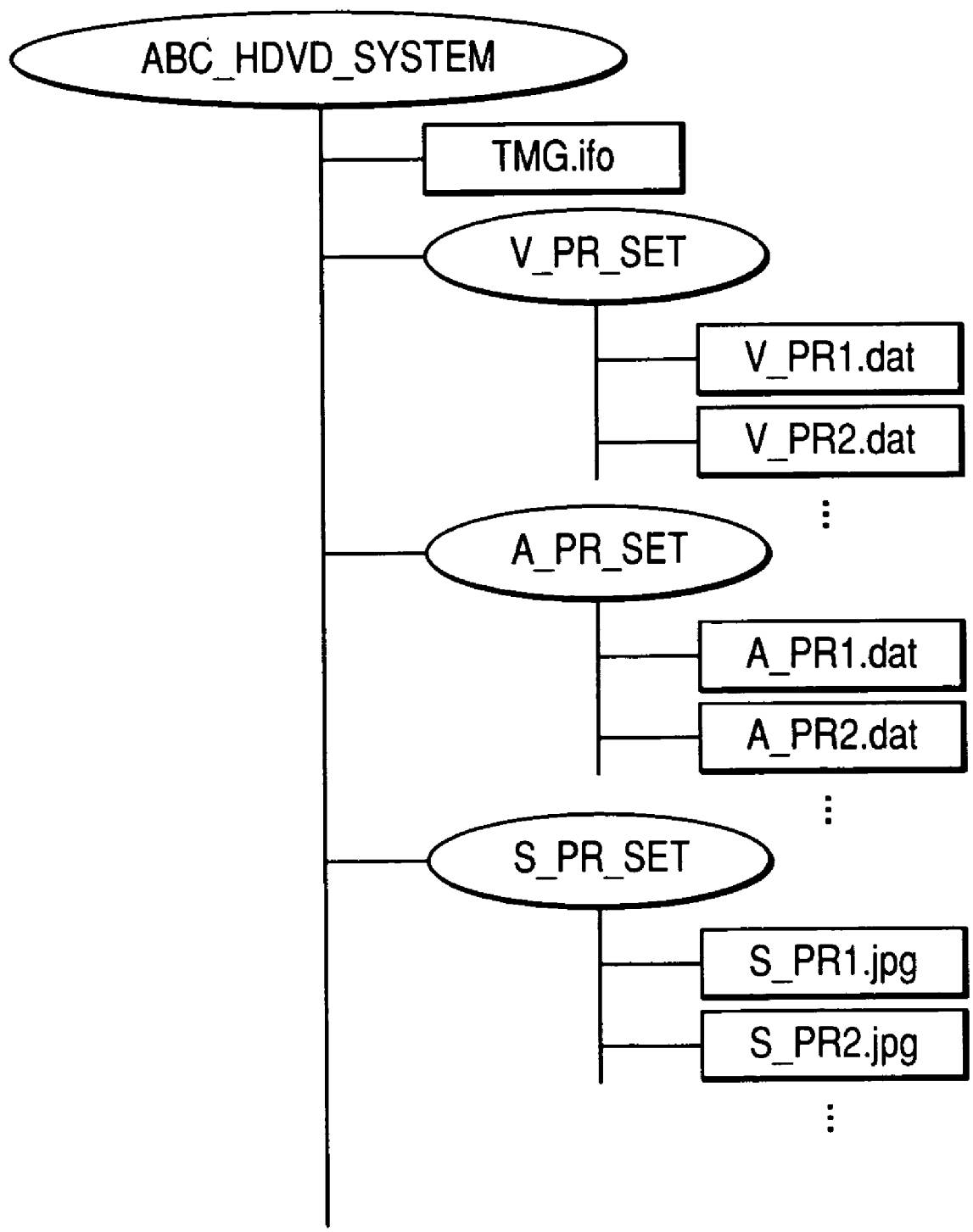
FIG. 7 is a diagram of a directory and file structure in a first embodiment of this invention.

FIG. 7 shows an example of a data structure (a directory and file structure) accorded with a disc format used in a first embodiment of this invention. The data structure in FIG. 7 may be a modification or customization of that in FIG. 3.

With reference to FIG. 7, an ABC_HDVD_SYSTEM directory exists under a root directory (not shown in FIG. 7). All management data, audio data, moving-picture data, and still-picture data are stored as files under the ABC_HDVD_SYSTEM directory. The ABC_HDVD_SYSTEM directory corresponds to the DVD_RTAV directory in FIG. 3 while the files of management data, audio data, moving-picture data, and still-picture data correspond to the VR_MANGR.IFO file, the VR_AUDIO.VRO file, the VR_MOVIE.VRO file, and the VR_STILL.VRO file in FIG. 3.

Regarding moving-picture files, a V_PR_SET directory exists under the ABC_HDVD_SYSTEM directory. The V_PR_SET directory is designed for grouping recorded VOBs. Each VOB is recorded in the V_PR_SET directory as a V_PRn.dat file ("n" denotes a program ID number starting from "1"). Each VOB has a program stream or a transport stream conforming with the MPEG-2 system standards. The V_PRn.dat files correspond to the VR_MOVIE.VRO file in FIG. 3.

Regarding audio files, an A_PR_SET directory exists under the ABC_HDVD_SYSTEM directory. The A_PR_SET directory is designed for grouping recorded audio objects (AOBs) similar to VOBs. Each AOB is recorded in the A_PR_SET directory as an A_PRn.dat file ("n" denotes a program ID number starting from "1"). Each AOB has a program stream or a transport stream conforming with the MPEG-2 system standards. The A_PRn.dat files correspond to the VR_AUDIO.VRO file in FIG. 3.

Figure 8:
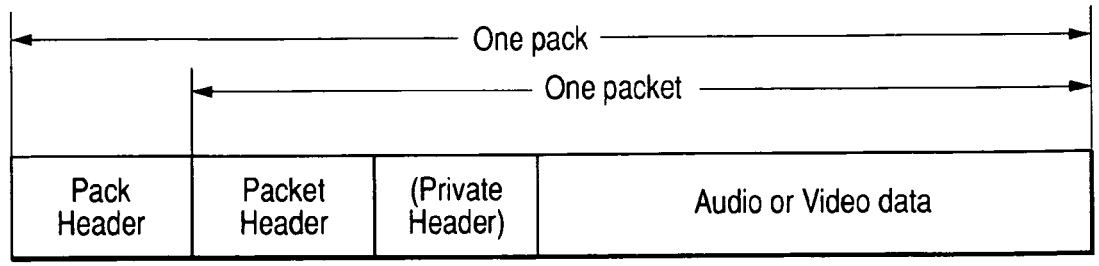
FIG. 8 is a diagram of the structure of one data pack prescribed by the MPEG standards.

Packing data is implemented for recording VOBs and AOBs. As shown in FIG. 8, one data pack prescribed by the MPEG-2 standards has a pack header and a packet following the pack header. The packet has a packet header and an audio or video data area following the packet header. A private header may be placed between the packet header and the audio or video data area. Each VOB or AOB is divided into segments each having a prescribed number of bytes. Each VOB or AOB segment is placed in the audio or video data area in a packet.

With reference back to FIG. 7, there is an S_PR_SET directory under the ABC_HDVD_SYSTEM directory regarding still-picture files. The S_PR_SET directory is designed for grouping files of recorded still pictures. Each still-picture file is recorded in the S_PR_SET directory as an S_PRn.jpg file ("n" denotes a program ID number starting from "1"). Thus, the still-picture files are JPEG files. The S_PRn.jpg files correspond to the VR_STILL.VRO file in FIG. 3.

It should be noted that groups of files relating to moving-picture, audio, and still-picture programs may be recorded under a same directory such as an AVS_PR_SET directory.

One moving-picture program is recorded as one V_PRn.dat file. Similarly, one audio program is recorded as one A_PRn.dat file. All video programs may be continuously recorded as one file, for example, a V_PR.dat file. In this case, special information representing the correspondence between the programs and the portions of the V_PR.dat file is additionally stored. Similarly, all audio programs may be continuously recorded as one file, for example, an A_PR.dat file. In this case, special information representing the correspondence between the programs and the portions of the A_PR.dat file is additionally stored. One still-picture program is recorded as one S_PRn.jpg file. One still-picture program has only one still picture.

There is a TMG.ifo file under the ABC_HDVD_SYSTEM directory. The TMG.ifo means total manager information. The TMG.ifo file is designed for storing original management data and user defined management data (also referred as play lists hereafter). The TMG.ifo file corresponds to the VR_MANGR.IFO file in FIG. 3. The original management data corresponds to the original PGC in FIG. 4. The user defined management data corresponds to the user defined PGC in FIG. 5.

Figure 9:
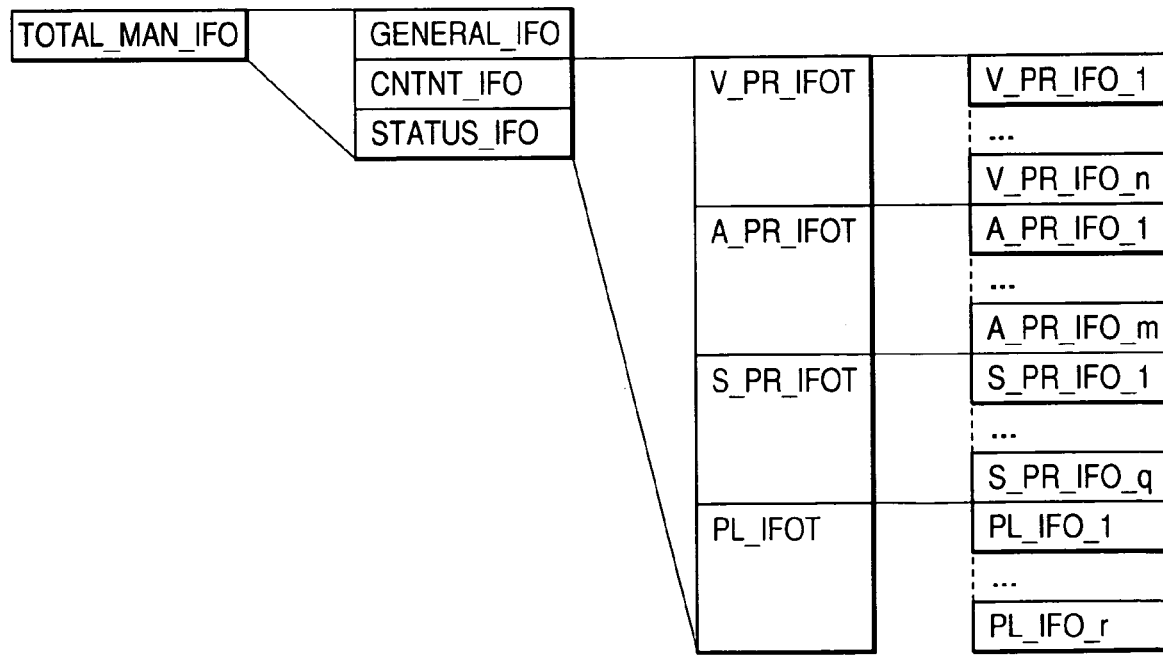
FIG. 9 is a diagram of the structure of a TMG.ifo file in the first embodiment of this invention.

FIG. 9 shows the structure of the TMG.ifo file. As shown in FIG. 9, the TMG.ifo file has TOTAL_MAN_IFO (total manager information) which consists of GENERAL_IFO (general information), CNTNT_IFO (content information), and STATUS_IFO (status information).

The STATUS_IFO represents information relating to the status such as the ID number or the type of a last-played-back program.

The CNTNT_IFO consists of a moving-picture program information structural body V_PR_IFOT (video program information table), an audio program information structural body A_PR_IFOT (audio program information table), a still-picture program information structural body S_PR_IFOT (video program information table), and a play list information structural body PL_IFOT (play list information table). Each of the moving-picture program information structural body V_PR_IFOT, the audio program information structural body A_PR_IFOT, and the still-picture program information structural body S_PR_IFOT has parts corresponding to respective programs. The play list information structural body PL_IFOT has parts corresponding to respective play lists.

The V_PR_IFOT, the A_PR_IFOT, and the S_PR_IFOT are original management data for moving pictures, audio, and still pictures, respectively. The PL_IFOT is user defined management data.

The V_PR_IFOT has a group of information pieces V_PR_IFO_i ("i" denotes an integer from "1" to "n") for respective moving-picture programs.

The A_PR_IFOT has a group of information pieces A_PR_IFO_j ("j" denotes an integer from "1" to "m") for respective audio programs.

The S_PR_IFOT has a group of information pieces S_PR_IFO_k ("k" -denotes an integer from "1" to "q") for respective still-picture programs. Each of the still-picture programs has only one still picture.

The PL_IFOT has a group of information pieces PL_I-FO_p ("p" denotes an integer from "1" to "r") for respective play lists.

The integers "i", "j", "k", and "p" are referred to as the V_PR_IFO number, the A_PR_IFO number, the S_PR_IFO number, and the PL_IFO number, respectively.

FIG. 10 shows an example of the data field and the contents of the partial moving-picture program information structural body V_PR_IFO_i.

With reference to FIG. 10, a PR number (V_PRN) means the ID number "i" of the related moving-picture program, and is equal to the V_PR_IFO number.

A Video Group number (V_GRN) means the ID number of the moving-picture group having the related moving-picture program.

There is a V_ATR field in which various-type attribute information about moving-picture data (VOBs) referred to by the present V_PR_IFO_i is described. The various-type attribute information has "Video_compression_mode" indicating the used compression system, "TV_system" indicating the related broadcasting system such as PAL or NTSC, "Aspect_ratio" indicating an aspect ratio of frames represented by the related moving-picture data, "Horizontal_video_resolution" indicating a horizontal resolution of the related moving pictures, and "Vertical_video_resolution" indicating a vertical resolution of the related moving pictures.

The V_PR_IFO_i is designed to describe attribute information and address information necessary for the playback of the related moving-picture program, and annexed information such as text information. The V_PR_IFO_i may take an information structure different from that of FIG. 10.

FIG. 11 shows an example of the data field and the contents of the partial audio program information structural body A_PR_IFO_j.

With reference to FIG. 11, a PR number (A_PRN) means the ID number "j" of the related audio program, and is equal to the A_PR_IFO number.

An Audio Group number (A_GRN) means the ID number of the audio group having the related audio program.

A Track number (TKN) means a track ID number in the present audio group.

The A_PR_IFO_j is designed to describe attribute information and address information necessary for the playback of the related audio program, and annexed information such as text information. The A_PR_IFO_i may take an information structure different from that of FIG. 11.

FIG. 12 shows an example of the data field and the contents of the partial still-picture program information structural body S_PR_IFO_k relating to one still-picture program and one still picture.

With reference to FIG. 12, a PR number (S_PRN) means the ID number "k" of the related still-picture program, and is equal to the S_PR_IFO number.

A Still picture Group number (S_GRN) means the ID number of the still-picture group having the related still-picture program.

A Linked_video_program_number is set to the PR_number of a moving-picture program linked with the present still-picture program. In the absence of a linked moving-picture program, the Linked_video_program_number is set to "0".

A Linked_video_entry_time indicates a time code (a time position) of a picture in the linked moving-picture program which picture is linked with the picture in the present still-picture program. The linked picture in the moving-picture program is, for example, a frame or a field.

Accordingly, the Linked_video_program_number and the Linked_video_entry_time constitute link information representing the correspondence (the link) between the present still-picture and the linked picture in the linked moving-picture program.

An entry_offset_time indicates an offset time between a first time position at which an entry should be actually executed and a second time position coincident with the time code (the time position) of the linked picture in the linked moving-picture program. The first time position precedes the second time position by the offset time. Accordingly, an entry is required to be executed the offset-time before the time code (the time position) of the linked picture in the linked moving-picture program.

The entry_offset_time is offset information. The link information and the offset information make a pair referred to as correspondence information.

There is an S_ATR field in which various-type attribute information about still-picture data referred to by the present S_PR_IFO_k is described. The various-type attribute information has "Video_compression_mode" indicating the used compression system, "TV_system" indicating the related broadcasting system such as PAL or NTSC, and "Aspect_ratio" indicating an aspect ratio of the frame represented by the related still-picture data.

The S_PR_IFO_k is designed to describe attribute information and address information necessary for the playback of the related still-picture program, and annexed information such as text information. The S_PR_IFO_i may take an information structure different from that of FIG. 12.

FIG. 13 shows an example of the data field and the contents of the partial play list information structural body PL_IFO_p.

With reference to FIG. 13, a PL number means the ID number "p" of the related play list.

A num_of_ud_programs indicates the number of user defined programs contained in the present play list. A user defined program UD_PR is set by the user, and one or more moving-picture programs, one or more audio programs, or one or more still-picture programs are described therein. One or more audio programs and one or more still-picture programs which should be simultaneously played back may be described therein.

A UD_PR_mode represents which of a moving-picture program or programs, an audio program or programs, and a still-picture program or programs are described in the corresponding UD_PR.

The PL_IFO_p is designed to describe attribute information and address information necessary for playing back the moving-picture program or programs, the audio program or programs, and the sill-picture program or programs while relating them with each other, and also annexed information such as text information. The PL_IFO_p may take an information structure different from that of FIG. 13.

The GENERAL_IFO in FIG. 9 has general information about the TOTAL_MAN_IFO which represents a System ID, a Version number, and the start addresses of the CNTNT_IFO and the STATUS_IFO.

FIG. 14 shows an example of the contents of the GENERAL_IFO. As shown in FIG. 14, the GENERAL_IFO has a Global_entry_offset field indicating an offset time regarding an entry from a picture in a moving-picture program which is linked with each still picture. Each offset time indicated by the Global_entry_offset field is made valid in the case where the entry_offset_time field in the partial still-picture program information structural body S_PR_IFO_k (see FIG. 12) relating to a corresponding still picture does not indicate a valid offset time.

Figure 15:
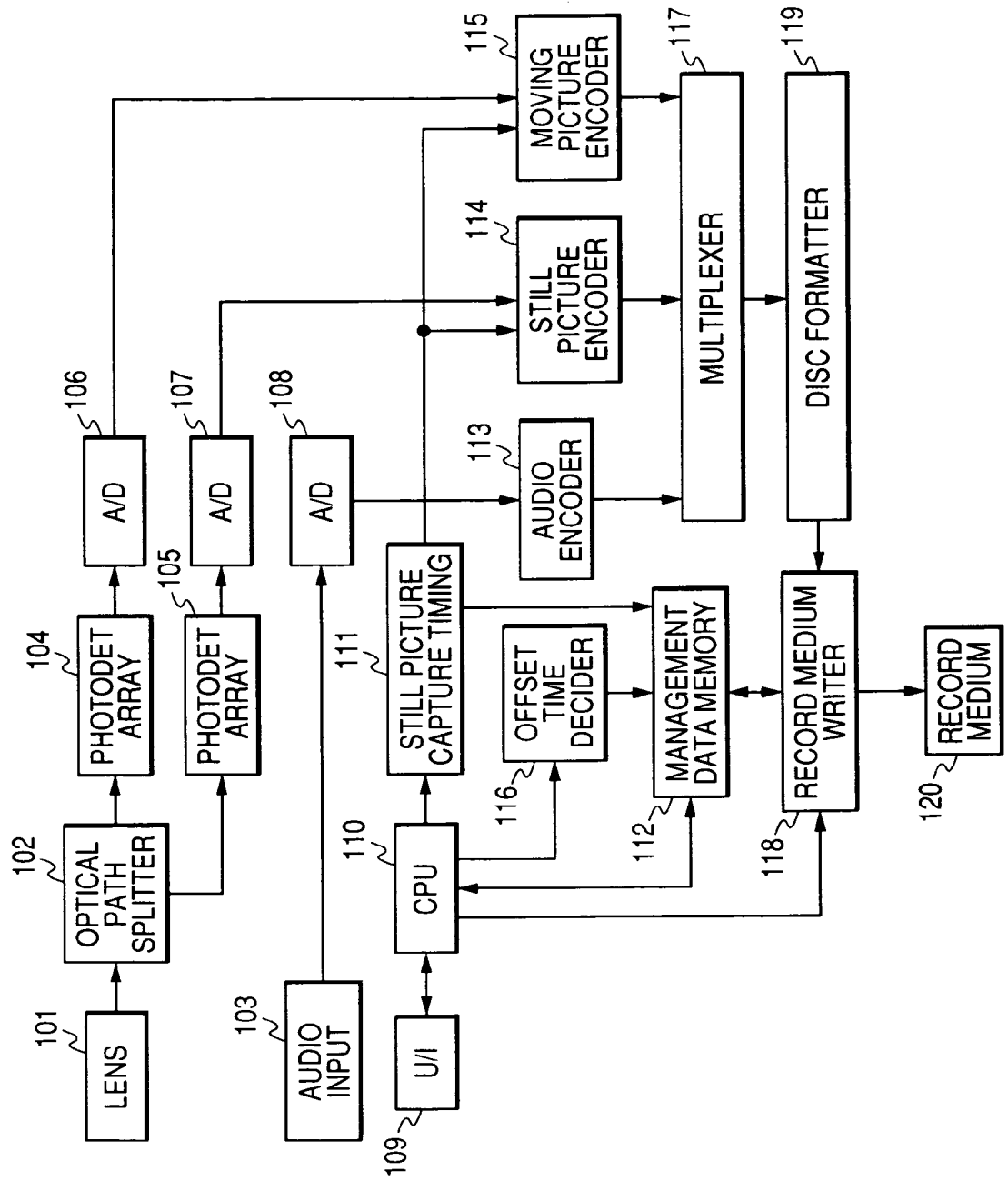
FIG. 15 is a block diagram of an information recording apparatus in the first embodiment of this invention.

FIG. 15 shows an information recording apparatus in the first embodiment of this invention. The apparatus of FIG. 15 uses the disc-format data structure of FIGS. 7-14. The apparatus of FIG. 15 is designed so that even during the recording of moving-picture data, still-picture data can also be recorded without interrupting the recording of moving-picture data. Furthermore, the apparatus of FIG. 15 can record correspondence information including link information and offset information. The link information representing a correspondence (a link) between each recorded still picture and a picture (or a frame) in a recorded moving-picture stream which is equal or similar in capture timing to the still picture. In general, a still picture and a moving picture equal or similar in capture timings are referred to as linked pictures. The link information pairs up with the offset information. The offset information designates an entry point used to search for a moving picture while using a still picture, with which the moving picture is linked, as an index picture. Specifically, the offset information represents a time position a prescribed interval before the time position of the picture in the moving-picture stream which is linked with the still picture or before the time position of the capture of the still picture (the time code of the still picture or the index picture).

The apparatus of FIG. 15 includes a lens 101. Incident light passes through the lens 101 before reaching an optical-path splitter 102. The optical-path splitter 102 includes a prism or a semitransparent mirror. The optical-path splitter 102 separates the incident light into first and second portions. The first portion of the incident light is applied to a photodetector element array or an image sensor 104 for capturing moving pictures. The second portion of the incident light is applied to a photodetector element array or an image sensor 105 for capturing still pictures. Each of the photodetector element arrays 104 and 105 includes, for example, a CCD device or a CMOS device. Preferably, the resolution of the still-picture photodetector element array 105 is greater than that of the moving-picture photodetector element array 104.

Figure 16:
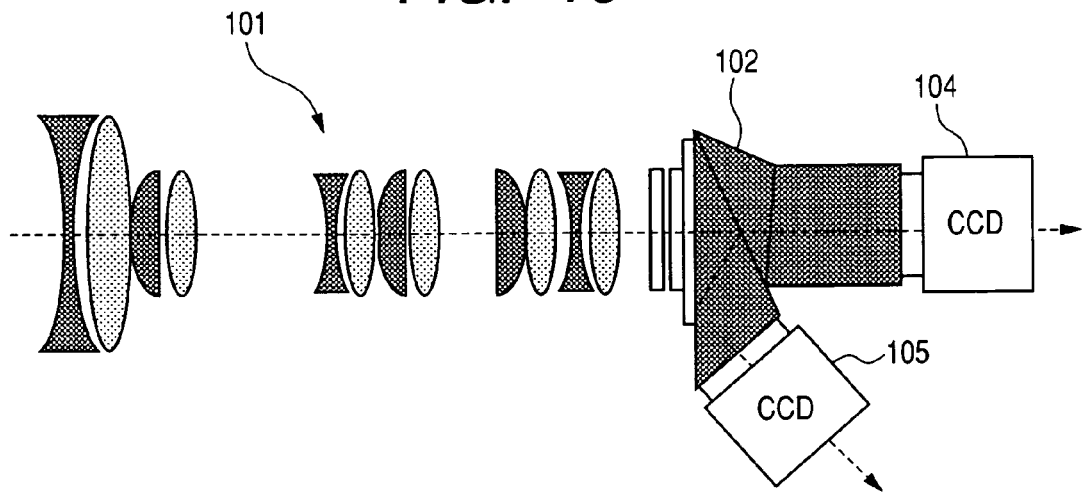
FIG. 16 is a sectional diagram of an optical block including a lens, an optical-path splitter, and photodetector element arrays in FIG. 15.

The lens 101, the optical-path splitter 102, and the photodetector element arrays 104 and 105 are contained in an optical block. FIG. 16 shows an example of the optical block. With reference to FIG. 16, the lens 101 includes a group of sub lenses successively arranged along the incident-light path. The optical-path splitter 102 includes a prism following the lens 101. The optical-path splitter 102 has first and second output portions facing the photodetector element arrays 104 and 105 respectively. Each of the photodetector element arrays 104 and 105 includes a CCD device.

With reference back to FIG. 15, the photodetector element array 104 converts the applied light into an electric analog picture signal through photoelectric conversion. The photodetector element array 104 outputs the analog picture signal to an A/D converter 106. The A/D converter 106 changes the analog picture signal into a corresponding digital picture signal. The A/D converter 106 outputs the digital picture signal to a moving-picture encoder 115. The device 115 encodes the digital picture signal according to the MPEG standards to get encoded moving-picture data. The moving-picture encoder 115 outputs the encoded moving-picture data to a multiplexer 117. The encoding of the signal by the moving-picture encoder 115 includes the compression of the signal.

The photodetector element array 105 converts the applied light into an electric analog picture signal through photoelectric conversion. The photodetector element array 105 outputs the analog picture signal to an A/D converter 107. The A/D converter 107 changes the analog picture signal into a corresponding digital picture signal. The A/D converter 107 outputs the digital picture signal to a still-picture encoder 114. The still-picture encoder 114 handles the digital picture signal as a signal representative of a still picture, and encodes the digital picture signal according to the JPEG standards to get encoded still-picture data. The still-picture encoder 114 outputs the encoded still-picture data to the multiplexer 117. The encoding of the signal by the still-picture encoder 114 includes the compression of the signal.

An audio input device 103 outputs an analog audio signal to an A/D converter 108. The audio input device 103 includes, for example, a microphone. The A/D converter 108 changes the analog audio signal into a corresponding digital audio signal. The A/D converter 108 outputs the digital audio signal to an audio encoder 113. The audio encoder 113 subjects the digital audio signal to an encoding process inclusive of signal compression accorded with, for example, "Dolby AC3". Thereby, the audio encoder 113 converts the digital audio signal into encoded audio data. The audio encoder 113 outputs the encoded audio data to the multiplexer 117.

The multiplexer 117 receives the encoded audio data, the encoded still-picture data, and the encoded moving-picture data from the audio encoder 113, the still-picture encoder 114, and the moving-picture encoder 115 respectively. The device 117 multiplexes the encoded audio data, the encoded still-picture data, and the encoded moving-picture data on a time sharing basis to get multiplexed data. The multiplexer 117 outputs the multiplexed data to a disc formatter 119.

The device 119 formats the multiplexed data into a data structure equal to that of FIGS. 7-14, and thereby generates formatted data. The disc formatter 119 outputs the formatted data to a recording medium writer 118.

An user interface (U/I) 109 is a device for inputting information of operation by a user. For example, in the case where operation information representing that a shutter button (a still-picture recording button) in the user interface 109 is depressed by the user is inputted during the recording of moving-picture data, the user interface 109 outputs a signal representative of the timing of the depression of the shutter button to a CPU 110.

Upon the reception of the shutter-button depression timing signal, the CPU 110 sends a still-picture capture timing signal generator 111 a command to start the recording of still-picture data.

Upon the reception of the still-picture recording start command, the still-picture capture timing signal generator 111 sends a still-picture recording start signal to the still-picture encoder 114 and the moving-picture encoder 115. At the same time, the still-picture capture timing signal generator 111 produces a signal representing a program ID number of a still picture to be recorded, and signals representing a picture time code (a picture time position) and a program ID number of a moving picture, for example, a moving-picture frame linked with the still picture. The still-picture capture timing signal generator 111 sends these produced signals to a management data memory 112. Furthermore, the still-picture capture timing signal generator 111 sends the produced signal representative of the still-picture program ID number to the moving-picture encoder 115.

Upon the reception of the still-picture recording start signal, the still-picture encoder 114 starts encoding the output signal of the A/D converter 107. The still-picture encoder 114 outputs the resultant encoded still-picture data to the multiplexer 117.

Upon the reception of the still-picture recording start signal, the moving-picture encoder 115 starts encoding the current portion of the moving-picture data, that is, the digital picture signal outputted from the A/D converter 106. At the same time, the moving-picture encoder 115 sets and places the received signal representative of the still-picture program ID number in an MPEG user data area added for the current picture represented by the encoded moving-picture data. Thereby, a still picture captured during the recording of moving pictures, and one of the moving pictures which is captured at a timing equal or similar to the timing of the capture of the still picture are made into a correspondence relation (a link). By referring to this correspondence relation, the linked still picture can be found from the moving-picture side. The moving-picture encoder 115 outputs the resultant encoded moving-picture data to the multiplexer 117.

The still-picture program ID number means the PR_number (S PRN) in the S_PR_IFO field of the partial still-picture program information structural body in FIG. 12.

Figure 17:
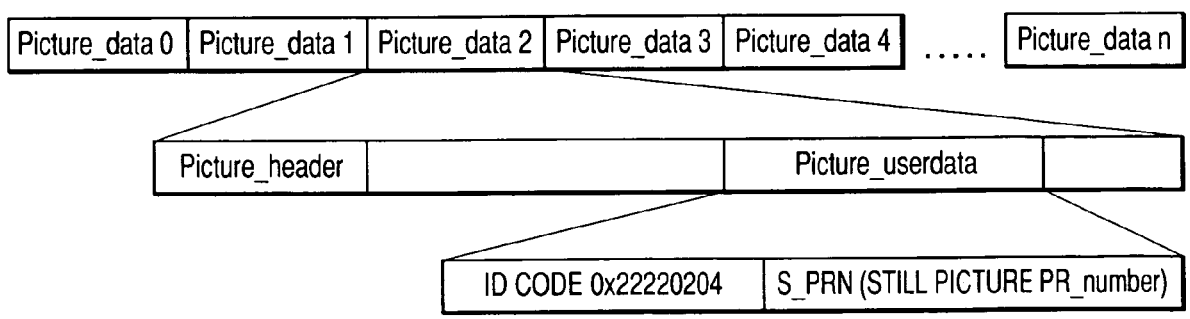
FIG. 17 is a diagram of the structure of an MPEG stream.

With reference to FIG. 17, an MPEG stream is divided into time portions representing respective pictures and denoted as "Picture_data 0", "Picture_data 1", "Picture_data 2", . . . , and "Picture_data n". Each picture-representing time portion has a user data area "Picture_userdata" that means the MPEG user data area for storing the signal representative of the still-picture program ID number (the PR_number).

FIG. 18 shows the syntax of one picture in the MPEG-2 video layer. In FIG. 18, there is "user_data" that is used as the MPEG user data area. The "user_data" starts from a uniquely-decidable byte-aligned start code "User_data_start_code" and continues until the occurrence of 3 bytes each of "0x000001". The still-picture ID information (S_PRN) is described in the "user_data". There is a possibility that another application may use the "user_data". Accordingly, an ID code of "0x22220204" representing that the still-picture ID information (S_PRN) in the present embodiment of this invention will follow is described in 4 bytes in the "user_data" which are subsequent to the start code "User_data_start_code". Thereby, it is possible to prevent the still-picture ID information (S_PRN) from being confused with user data to be employed by the other application.

It should be noted that the length of the above-indicated ID code may differ from 4 bytes. Furthermore, the ID code may be of a logic state other than "0x22220204".

With reference back to FIG. 15, an offset time decider 116 sends the previously-mentioned offset information to the management data memory 112 in response to a command from the CPU 110. The offset information can be set via the user interface 109, the CPU 110, and the offset time decider 116 in accordance with a user's request. The offset information may be previously set in a memory within the apparatus of FIG. 15 (for example, a memory within the CPU 110 or the offset time decider 116) as a default.

The management data memory 112 prepares and manages the previously-mentioned TMG.ifo file while being controlled by the CPU 110. The management data memory 112 stores the TMG.ifo file. The management data memory 112 repetitively updates the TMG.ifo file stored therein in accordance with the progress of recording. As previously mentioned, the signal representing the program ID number of the still picture to be recorded, and the signals representing the picture time code and the program ID number of the moving picture (the moving-picture frame) linked with the still picture are sent to the management data memory 112 from the still-picture capture timing signal generator 111. Furthermore, the offset information is sent to the management data memory 112 from the offset time decider 116. These signals and offset information are processed by use of the management data memory 112 in accordance with commands from the CPU 110.

The CPU 110 decides whether a partial still-picture program information structural body having a program ID number equal to the still-picture program ID number sent to the management data memory 112 is present in or absent from the TMG.ifo file in the management data memory 112. When it is decided that such a partial still-picture program information structural body is absent from the TMG.ifo file, the CPU 110 newly generates the partial still-picture program information structural body and controls the management data memory 112 to add the newly-generated partial still-picture program information structural body to the stored TMG.ifo file. Then, the CPU 110 controls the management data memory 112 to set or place the program ID number of the newly-generated partial still-picture program information structural body in the PR_number field thereof.

The CPU 110 controls the management data memory 112 so that the program ID number of the moving picture (the moving-picture frame) linked with the still picture will be set or placed in the Linked_video_program_number field of the newly-generated partial still-picture program information structural body. The moving-picture program ID number is the same as the PR_number in the V_PR_IFO field of the partial moving-picture program information structural body of FIG. 10 which is generated for the moving-picture program having the linked moving picture. Thus, the PR_number of the partial moving-picture program information structural body for the linked moving picture is described in the Linked_video_program_number field of the partial still-picture program information structural body for the still picture. Thereby, a link between the moving-picture program and the still picture is provided and established as detectable one. This link is in the direction from the still-picture side to the moving-picture side.

The CPU 110 controls the management data memory 112 to set or place the picture time code of the linked moving-picture frame in the Linked_video_entry_time field of the newly-generated partial still-picture program information structural body. The picture time code allows the identification of the related picture (frame) in the moving-picture program. For example, the picture time code uses a time code which is described in the header of every GOP defined by the MPEG standards, and which indicates hour, minute, second, and a frame number. Setting or placing the picture time code of the linked moving-picture frame in the Linked_video_entry_time field of the newly-generated partial still-picture program information structural body provides a detectable link between the frame (picture) in the moving-picture program and the still picture. It should be noted that other information which allows the identification of a picture in the moving-picture program may be described in the Linked_video_entry_time field instead of the time code. For example, the other information indicates the number of frames from the head of the moving-picture program or the address (the number of bytes) from the head of the moving-picture program.

The CPU 110 controls the management data memory 112 to set or place the offset information in the entry_offset_time field of the newly-generated partial still-picture program information structural body. The offset information is expressed in the same time units as those for the picture time code. The offset information allows the designation of a picture (or a frame) in the moving-picture program which will correspond to an entry point during a search.

As previously mentioned, the multiplexer 117 receives the encoded audio data, the encoded still-picture data, and the encoded moving-picture data from the audio encoder 113, the still-picture encoder 114, and the moving-picture encoder 115 respectively. The device 117 multiplexes the encoded audio data, the encoded still-picture data, and the encoded moving-picture data on a time sharing basis to get multiplexed data. The multiplexer 117 outputs the multiplexed data to the disc formatter 119.

The device 119 formats the multiplexed data so that the encoded moving-picture data, the encoded still-picture data, and the encoded audio data therein will be assigned to and loaded into a moving-picture V_PRn.dat file in the moving-picture directory V_PR_SET, a still-picture S_PRn.jpg file in the still-picture directory S_PR_SET, and an audio A_PRn.dat file in the audio directory A_PR_SET (see FIG. 7) respectively.

The recording medium writer 118 receives the TMG.ifo file from the management data memory 112 while being controlled by the CPU 110. The recording medium writer 118 receives the moving-picture V_PRn.dat file, the still-picture S_PRn.jpg file, and the audio A_PRn.dat file from the disc formatter 119. The device 118 records the TMG.ifo file, the moving-picture V_PRn.dat file, the still-picture S_PRn.jpg file, and the audio A_PRn.dat file on a recording medium 120 in accordance with a control signal outputted from the CPU 110. Preferably, the recording of the moving-picture V_PRn.dat file, the still-picture S_PRn.jpg file, and the audio A_PRn.dat file precedes the recording of the TMG.ifo file.

A buffer is provided in the disc formatter 119 or the recording medium writer 118. The buffer implements the buffering of the formatted data generated by the disc formatter 119.

The CPU 110 can control the devices 103-109, and 111-119. The CPU 110 operates in accordance with a control program (a computer program) stored in its internal memory. The control program may be read out from a recording medium before being stored into the memory within the CPU 110. Alternatively, the control program may be downloaded into the memory within the CPU 110 via a communication network.

Figure 19:
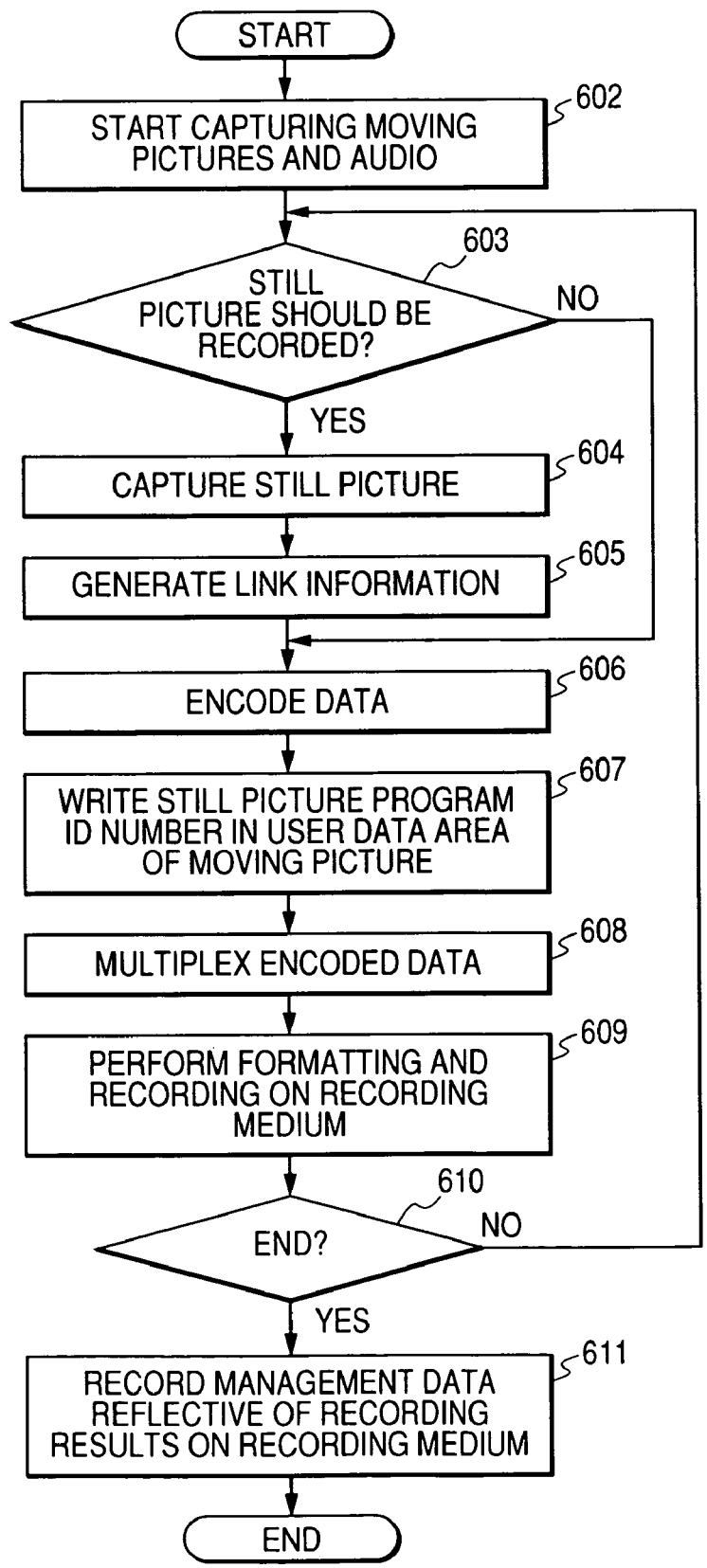
FIG. 19 is a flowchart of a control program for a CPU in FIG. 15.

FIG. 19 is a flowchart of the computer program. As shown in FIG. 19, a first step 602 of the computer program controls the photodetector element array 104 and the A/D converter 106 to start the capture of moving pictures and the generation of corresponding moving-picture data. In addition, the step 602 controls the audio input device 103 and the A/D converter 108 to start of the generation of audio data. After the step 602, the computer program advances to a step 603.

The step 603 decides whether or not a still picture should be recorded by referring to information from the user interface 109. The information from the user interface 109 represents, for example, the depression of the shutter button (the still-picture recording button). When it is decided that a still picture should be recorded, the computer program advances from the step 603 to a step 604. Otherwise, the computer program jumps from the step 603 to a step 606.

The step 604 controls the photodetector element array 105 and the A/D converter 107 to capture a still picture and generate corresponding still-picture data.

A step 605 following the step 604 controls the still-picture capture timing signal generator 111 to generate link information representing a picture time code (a picture time position) and a program ID number of a moving picture, for example, a moving picture frame linked with the captured still picture. The step 605 controls the offset time decider 116 to set offset information related to the captured still picture. The offset information designates an entry point used to search for a moving picture while using a still picture, with which the moving picture is linked, as an index picture. Specifically, the offset information represents a time position a prescribed interval before the time position of the picture in the moving-picture stream which is linked with the captured still picture or before the time position of the captured still picture (that is, the time code of the captured still picture or the index picture). The offset information and the link information are paired or combined to form correspondence information. The correspondence information will be used in the updating of the TMG.ifo file in the management data memory 112. After the step 605, the computer program advances to the step 606.

The step 606 controls the moving-picture encoder 115 to encode the moving-picture data through an MPEG-2 compressively encoding procedure to get encoded moving-picture data. In addition, the step 606 controls the audio encoder 113 to encode the audio data through a Dobly-AC3 encoding procedure or an MPEG audio encoding procedure to get encoded audio data. Furthermore, the step 606 controls the still-picture encoder 114 to encode the still-picture data through a JPEG compressively encoding procedure to get encoded still-picture data.

A step 607 subsequent to the step 606 controls the still-picture capture timing signal generator 111 and the moving-picture encoder 115 to set and place the signal representative of the program ID number of the captured still picture in a user data area provided in the encoded moving-picture data for a moving-picture frame linked with the captured still picture. The still-picture program ID number is equal to the PR_number (S_PRN) in the S_PR_IFO field of the partial still-picture program information structural body in FIG. 12.

A step 608 following the step 607 controls the multiplexer 117 to multiplex the encoded moving-picture data, the encoded audio data, and the encoded still-picture data to get multiplexed data. During the multiplexing, the encoded moving-picture data, the encoded audio data, and the encoded still-picture data are processed into packs, and pack headers and time stamps are added thereto.

A step 609 subsequent to the step 608 controls the disc formatter 119 to format the multiplexed data into the data structure of FIGS. 7-14 to get the formatted data. In addition, the step 609 controls the recording medium writer 118 and the disc formatter 119 to subject the formatted data to buffering by use of the buffer in the device 118 or 119, and to record the buffering-resultant data on the recording medium 120. Each time a certain amount of the formatted data is stored in the buffer, the formatted data is sent therefrom and is recorded on the recording medium 120. The step 609 controls the management data memory 112 to update the TMG.ifo file therein in accordance with the present recoding. For the recorded still picture, the step 609 functions to generate a partial still-picture program information structural body in the TMG.ifo file, and to write the correspondence information (the link information and the offset information) therein. Specifically, the step 609 functions to place the program ID number of the linked moving picture (the linked moving-picture frame) in the Linked_video_program_number field of the partial still-picture program information structural body, and to place the picture time code of the linked moving-picture frame in the Linked_video_entry_time field of the partial still-picture program information structural body. Furthermore, the step 609 functions to place the offset information in the entry_offset_time field of the partial still-picture program information structural body.

A step 610 following the step 609 decides whether or not the recording of moving-picture data should be terminated by referring to, for example, information from the user interface 109. When it is decided that the recording should be terminated, the computer program advances from the step 610 to a step 611. Otherwise, the computer program returns from the step 610 to the step 603.

The step 611 controls the management data memory 112 and the recording medium writer 118 to record the TMG.ifo file on the recording medium 120. The TMG.ifo file contains the management data. Specifically, the TMG.ifo file includes the Linked_video_program_number information, the Linked_video_entry_time information, and the entry_offset_time information for each captured and recorded still picture. After the step 611, the current execution cycle of the computer program ends.

Second Embodiment

Figure 20:
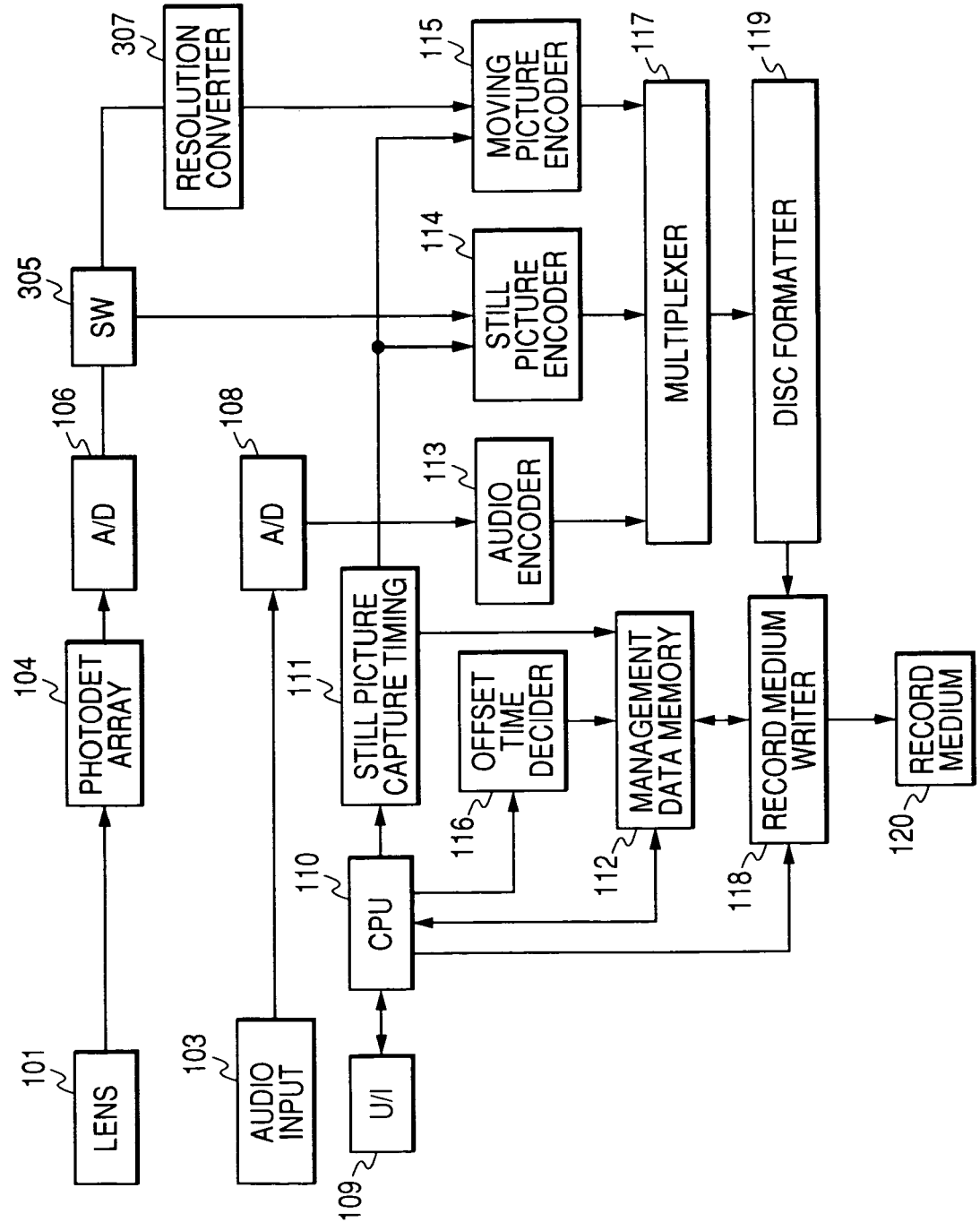
FIG. 20 is a block diagram of an information recording apparatus according to a second embodiment of this invention.

FIG. 20 shows an information recording apparatus according to a second embodiment of this invention. The apparatus of FIG. 20 is similar to the apparatus of FIG. 15 except for design changes described hereafter. The apparatus of FIG. 20 additionally includes a switch 305 and a resolution converter 307. The optical-path splitter 102, the photodetector element array 105, and the A/D converter 107 (see FIG. 15) are omitted from the apparatus of FIG. 20.

In the apparatus of FIG. 20, the lens 101 is directly followed by the photodetector element array 104. The photodetector element array 104 has a relatively high resolution.

Operation of the apparatus of FIG. 20 can be changed between a still-picture recording mode and a moving-picture recording mode.

During the moving-picture recording mode of operation, the switch 305 is controlled by the CPU 110 to direct the digital picture signal from the A/D converter 106 to the resolution converter 307. The resolution converter 307 processes the digital picture signal to reduce the resolution of every picture represented by the digital picture signal. Thereby, the resolution converter 307 obtains the resolution-reduced digital picture signal. The resolution converter 307 outputs the resolution-reduced digital picture signal to the moving-picture encoder 115. The device 115 encodes the resolution-reduced digital picture signal.

During the still-picture recording mode of operation, the switch 305 is controlled by the CPU 110 to direct the digital picture signal from the A/D converter 106 to the still-picture encoder 114. The device 114 encodes the digital picture signal.

Third Embodiment

Figure 21:
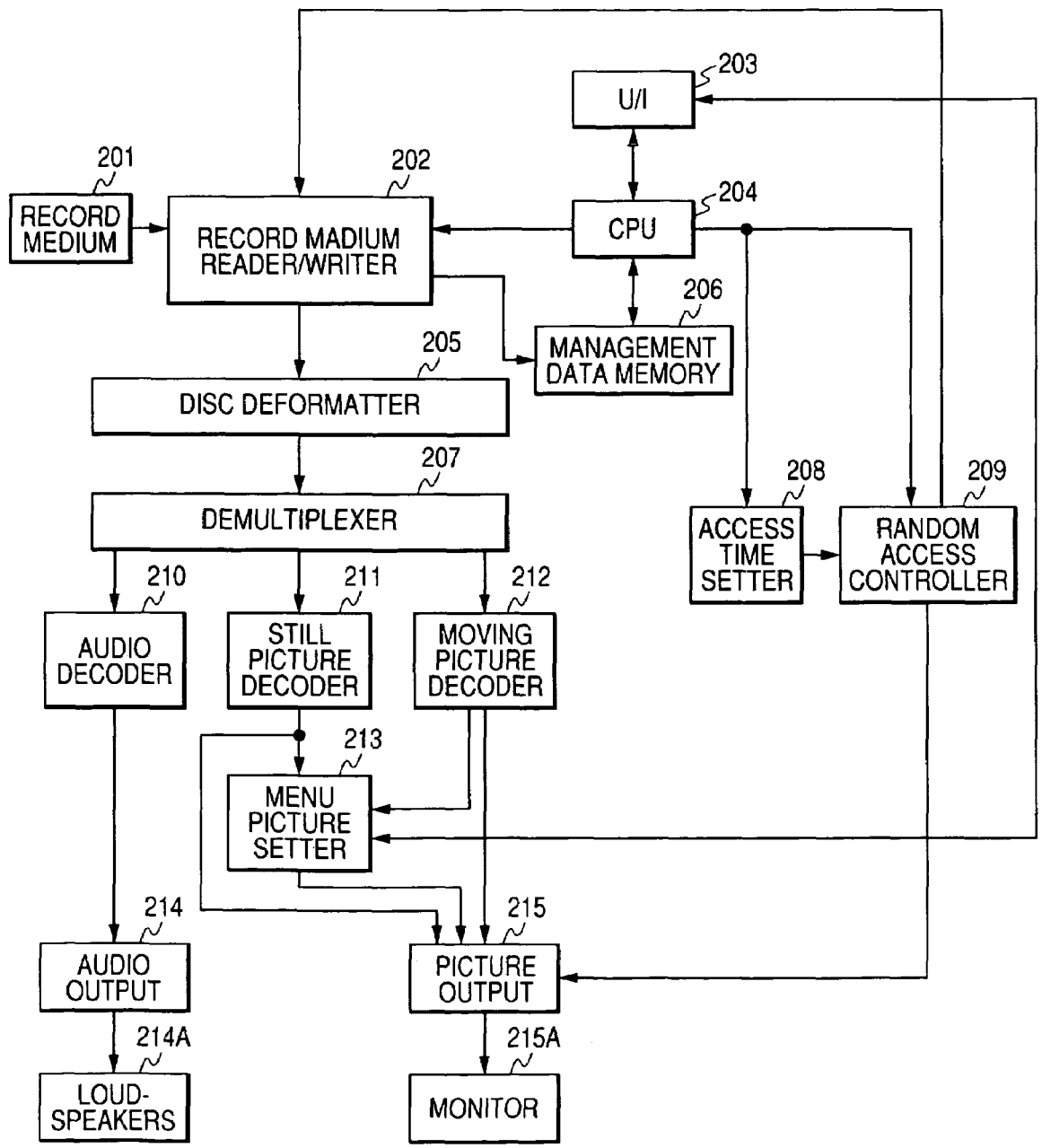
FIG. 21 is a block diagram of an information reproducing apparatus according to a third embodiment of this invention.

FIG. 21 shows an information reproducing apparatus according to a third embodiment of this invention. The apparatus of FIG. 21 reproduces data representing moving pictures, and also data representing still pictures which have been captured during the recording of the moving pictures. The apparatus of FIG. 21 plays back the moving pictures and the still pictures. During the playback of the moving pictures, the apparatus of FIG. 21 generates a menu picture having index pictures originating from the respective still pictures, and allows a user to carry out a search for a desired time position in the stream of the moving pictures by use of the menu picture.

The apparatus of FIG. 21 reproduces information from a recording medium 201. Basically, the information has been recorded on the recording medium 201 by the apparatus of FIG. 15 or FIG. 20.

The apparatus of FIG. 21 includes a user interface (U/I) 203 which sends a CPU 204 a user's command to start playback. Upon the reception of the playback start command from the user interface 203, the CPU 204 feeds a recording medium reader/writer 202 with a playback start signal.

Upon the reception of the playback start signal from the CPU 204, the recording medium reader/writer 202 reads out a moving-picture V_PRn.dat file, a still-picture S_PRn.jpg file, an audio A_PRn.dat file, and a TMG.ifo file (management data) from the recording medium 201. The recording medium reader/writer 202 stores the read-out TMG.ifo file into a management data memory 206. The recording medium reader/writer 202 feeds the read-out moving-picture V_PRn.dat file, still-picture S_PRn.jpg file, and audio A_PRn.dat file to a disc deformatter 205.

The device 205 deformats the moving-picture V_PRn.dat file, the still-picture S_PRn.jpg file, and the audio A_PRn.dat file into multiplexed data. The disc deformatter 205 outputs the multiplexed data to a demultiplexer 207.

The demultiplexer 207 separates the multiplexed data into encoded moving-picture data, encoded still-picture data, and encoded audio data. The demultiplexer 207 feeds the encoded audio data, the encoded still-picture data, and the encoded moving-picture data to an audio decoder 210, a still-picture decoder 211, and a moving-picture decoder 212 respectively.

The device 210 decodes the encoded audio data to get decoded audio data. The audio decoder 210 feeds the decoded audio data to an audio output device 214. The device 211 decodes the encoded still-picture data to get decoded still-picture data. The still-picture decoder 211 feeds the decoded still-picture data to a menu picture setter 213 and a picture output device 215. The device 212 decodes the encoded moving-picture data to get decoded moving-picture data. The moving-picture decoder 212 feeds the decoded moving-picture data to the picture output device 215. The moving-picture decoder 212 can feed the decoded moving-picture data to the menu picture setter 213.

The audio output device 214 converts the decoded audio data into an analog audio signal. The audio output device 214 includes, for example, a D/A converter, an amplifier, and a connection terminal which are successively connected. The audio output device 214 feeds the analog audio signal to loudspeakers 214A. The loudspeakers 214A convert the analog audio signal into corresponding sounds.

The picture output device 215 converts the decoded moving-picture data into an analog moving-picture signal. In addition, the picture output device 215 converts the decoded still-picture data into an analog still-picture signal. The picture output device 215 includes, for example, a combination of a D/A converter and a connection terminal. The picture output device 215 feeds the analog moving-picture signal and the analog still-picture signal to a monitor (a display) 215A. The monitor 215A visualizes pictures represented by the analog moving-picture signal and pictures represented by the analog still-picture signal.

The monitor 215A may be provided with loudspeakers. In this case, the audio output device 214 is connected to the loudspeakers in the monitor 215A.

The apparatus of FIG. 21 can operate in a setting mode. During the setting mode of operation, the menu picture setter 213 is activated by a command from the CPU 204. The menu picture setter 213 processes the decoded still-picture data to reduce still pictures into index pictures. Thereby, the menu picture setter 213 generates data representing index pictures which are still pictures reduced from those represented by the decoded still-picture data. The menu picture setter 213 receives, from the moving-picture decoder 212, the decoded moving-picture data representing moving-picture frames designated by the offset information related to the respective still pictures (the respective index pictures). The menu picture setter 213 receives the offset information from the management data memory 206 through the CPU 204 and the user interface 203. The offset information is in the TMG.ifo file in the management data memory 206. The menu picture setter 213 receives a signal representative of a control menu from the CPU 204 through the user interface 203. The menu picture setter 213 generates data representative of a menu picture from the index-picture data, the decoded moving-picture data, the offset information, and the control menu signal. The menu picture has large windows occupied by the index pictures, first small windows occupied by further reduced version of the index pictures, second small windows occupied by moving-picture frames designated by the offset information related to the respective still pictures (the respective index pictures), an indication of offset times represented by the offset information related to the respective still pictures, and the control menu. The menu picture setter 213 sends the menu-picture data to the picture output device 215. The picture output device 215 converts the menu-picture data into an analog menu-picture signal. The picture output device 215 feeds the analog menu-picture signal to the monitor 215A. The monitor 215A visualizes or indicates the menu picture represented by the analog menu-picture signal.

During the setting mode of operation, the user can access the index pictures (the still pictures), the control menu, and the indication of the offset times in the indicated menu picture by operating the user interface 203. During the setting mode of operation, when the user gives a command to the CPU 204 via the user interface 203 by referring to the indicated menu picture, an entry point can be set for each of the index pictures or a search for a scene (a picture or pictures) in the moving-picture stream can be conducted in connection with each of the index pictures.

Figure 22:
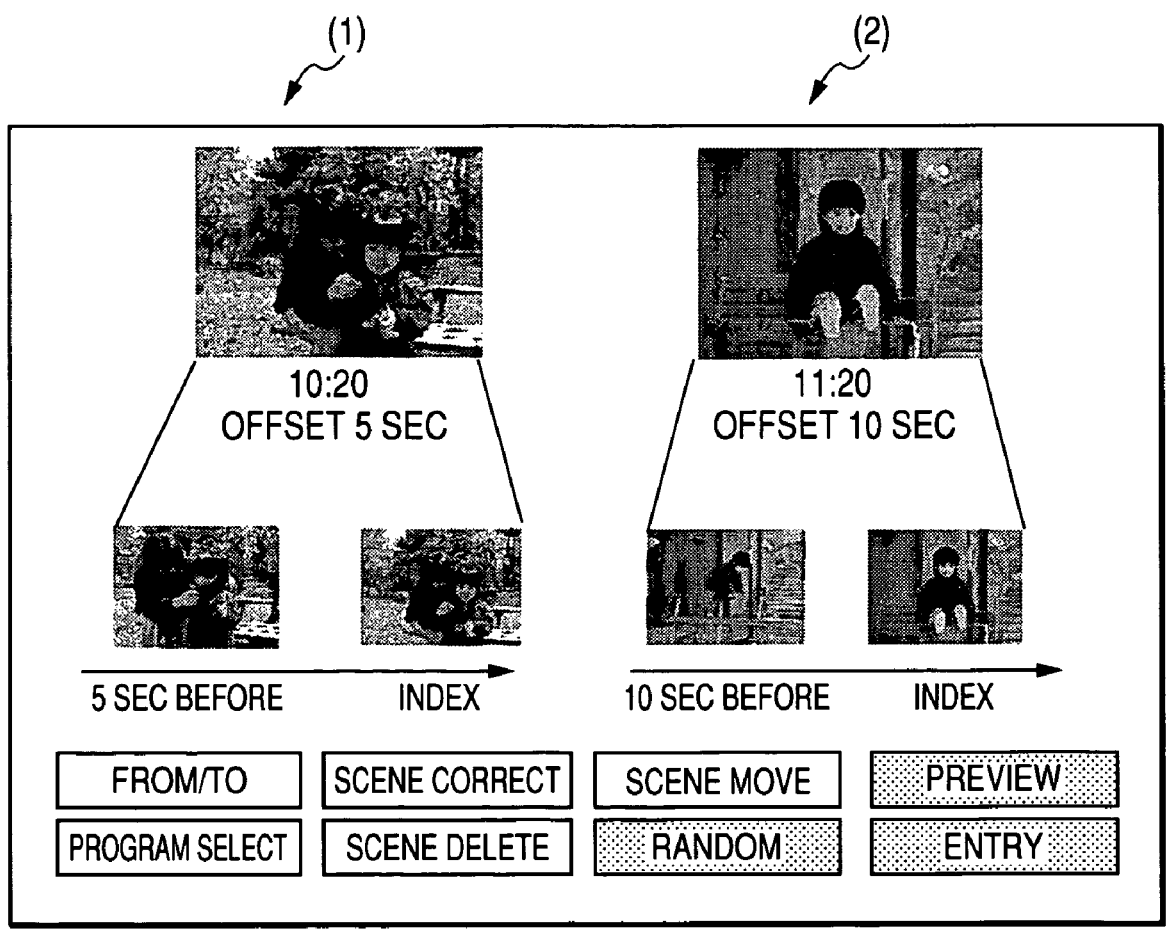
FIG. 22 is a diagram of a menu picture in the third embodiment of this invention.

An example of the setting of an entry point by use of the indicated menu picture will be described hereafter. FIG. 22 shows an example of the menu picture indicated to the user. The menu picture is also referred to as an offset time setting picture or an entry point setting picture. In FIG. 22, the menu picture has index pictures (1) and (2), and a control menu. The control menu has eight control items (commands), that is, "from/to", "scene correct", "scene move", "preview", "program select", "scene delete", "random", and "entry".

When the index picture (1) is selected by operating the control menu, a reduced version of the index picture (1) is indicated in the first small window at the lower right side of the index picture (1). At the same time, a moving-picture frame designated by the offset information related to the index picture (1) is indicated in the second small window at the lower left side of the index picture (1). In FIG. 22, an indication of a 5-second offset time represented by the offset information related to the index picture (1) is located below the index picture (1). When the index picture (2) is selected by operating the control menu, a reduced version of the index picture (2) is indicated in the first small window at the lower right side of the index picture (2). At the same time, a moving-picture frame designated by the offset information related to the index picture (2) is indicated in the second small window at the lower left side of the index picture (2). In FIG. 22, an indication of a 10-second offset time represented by the offset information related to the index picture (2) is located below the index picture (2).

The indication of a moving-picture frame in the menu picture is implemented in the following procedure. The CPU 204 derives information about a moving-picture frame linked with the selected index picture (the selected still picture) from the TMG.ifo file in the management data memory 206. The derived information includes information in the Linked_video_program_number field, information in the Linked_video_entry_time field, and information in the entry_offset_time field within the partial still-picture program structural body (see FIG. 12) having an ID number equal to that of the selected still picture. The CPU 204 sends the Linked_video_program_number information, the Linked_video_entry_time information, and the entry_offset_time information to an access time setter 208.

In response to the Linked_video-program-number information, the access time setter 208 identifies a moving-picture program to be accessed. The access time setter 208 calculates entry time from the Linked_video_entry_time information and the entry-offset-time information. The access time setter 208 notifies the identified moving-picture program and the calculated entry time to a random access controller 209. The random access controller 209 identifies a frame (a picture) in the identified moving-picture program which corresponds to the calculated entry time, and which is designated by the entry_offset_time information. The random access controller 209 generates a search control signal for finding the identified frame (the identified picture) in the identified moving-picture program. The random access controller 209 outputs the generated search control signal to the recording medium reader/writer 202.

In response to the search control signal, the device 202 reads out, from the recording medium 201, a portion of the moving-picture data which represents the identified frame (the identified picture) in the identified moving-picture program. The read-out moving-picture data is transmitted from the recording medium reader/writer 202 to the moving-picture decoder 212 through the disc deformatter 205 and the demultiplexer 207. The device 212 decodes the moving-picture data, and feeds the decoded moving-picture data to the menu picture setter 213. The menu picture setter 213 uses the decoded moving-picture data for the generation of the menu-picture data so that the second small window in the menu picture will be occupied by the moving-picture frame represented by the decoded moving-picture data.

The indicated moving-picture frames in the menu picture can be selected by operating the control menu. After the indicated moving-picture frame related to the index picture (1) and the 5-second offset time is selected by operating the control menu, the indicated moving-picture frame can be replaced by a moving-picture frame related to the index picture (1) and a 10-second offset time by operating the control menu.

The replacement of the indicated moving-picture frame by new one is implemented in the following procedure. The CPU 204 accesses the TMG.ifo file in the management data memory 206, and writes a value of 10 seconds in the entry_offset_time information in the partial still-picture program information structural body (see FIG. 12) corresponding to the selected index picture (1). In other words, the CPU 204 updates or changes the entry_offset_time information from a value of 5 seconds to a value of 10 seconds. Then, the CPU 204 derives information about a moving-picture frame linked with the selected index picture (the selected still picture) from the TMG.ifo file in the management data memory 206. The derived information includes information in the Linked_video_program_number field, information in the Linked_video_entry_time field, and updated information in the entry_offset_time field within the partial still-picture program structural body (see FIG. 12) corresponding to the selected index picture (1). The CPU 204 sends the Linked_video_program_number information, the Linked_video_entry_time information, and the updated entry_offset_time information (10 seconds) to the access time setter 208.

In response to the Linked_video_program_number information, the access time setter 208 identifies a moving-picture program to be accessed. The access time setter 208 calculates entry time from the Linked_video_entry_time information and the updated entry_offset_time information (10 seconds). The access time setter 208 notifies the identified moving-picture program and the calculated entry time to the random access controller 209. The random access controller 209 identifies a frame (a picture) in the identified moving-picture program which corresponds to the calculated entry time, and which is designated by the updated entry_offset_time information (10 seconds). The random access controller 209 generates a search control signal for finding the identified frame (the identified picture) in the identified moving-picture program. The random access controller 209 outputs the generated search control signal to the recording medium reader/writer 202.

In response to the search control signal, the device 202 reads out, from the recording medium 201, a portion of the moving-picture data which represents the identified frame (the identified picture) in the identified moving-picture program. The read-out moving-picture data is transmitted from the recording medium reader/writer 202 to the moving-picture decoder 212 through the disc deformatter 205 and the demultiplexer 207. The device 212 decodes the moving-picture data, and feeds the decoded moving-picture data to the menu picture setter 213. The menu picture setter 213 uses the decoded moving-picture data for the generation of the menu-picture data so that the second small window in the menu picture will be occupied by the moving-picture frame represented by the decoded moving-picture data. As a result, the moving-picture frame corresponding to an offset time of 5 seconds is replaced by that corresponding to an offset time of 10 seconds.

A search for a scene (a picture or pictures) in the moving-picture stream is implemented as follows. The CPU 204 derives information about a moving-picture frame linked with the selected index picture (the selected still picture) from the TMG.ifo file in the management data memory 206. The derived information includes information in the Linked_video_program_number field, information in the Linked_video_entry_time field, and information in the entry_offset_time field within the partial still-picture program structural body (see FIG. 12) corresponding to the selected index picture. The CPU 204 sends the Linked_video_program_number information, the Linked_video_entry_time information, and the entry_offset_time information to the access time setter 208.

In response to the Linked_video_program_number information, the access time setter 208 identifies a moving-picture program to be searched. The access time setter 208 calculates entry time from the Linked_video_entry_time information and the entry_offset_time information. The access time setter 208 notifies the identified moving-picture program and the calculated entry time to the random access controller 209. The random access controller 209 identifies a frame (a picture) in the identified moving-picture program which corresponds to the calculated entry time, and which is designated by the entry_offset_time information. The random access controller 209 generates a search control signal in response to the calculated entry time and the ID number of the identified moving-picture program. The generated search control signal allows finding the identified frame (the identified picture) in the identified moving-picture program. The generated search control signal contains information representing the calculated entry time. The random access controller 209 outputs the generated search control signal to the recording medium reader/writer 202 and the picture output device 215.

In response to the search control signal, the device 202 reads out, from the recording medium 201, a portion of the moving-picture data which represents the identified frame (the identified picture) in the identified moving-picture program. Then, the device 202 reads out subsequent portions of the moving-picture data. The read-out moving-picture data is transmitted from the recording medium reader/writer 202 to the moving-picture decoder 212 through the disc deformatter 205 and the demultiplexer 207. The device 212 decodes the moving-picture data, and feeds the decoded moving-picture data to the picture output device 215. The picture output device 215 derives, from the decoded moving-picture data, information of time of every picture (frame) represented by the decoded moving-picture data. The time information is, for example, a time stamp related to every picture. The picture output device 215 derives the entry time from the search control signal. The picture output device 215 compares the time of the current picture represented by the decoded moving-picture data with the entry time to decide whether or not the time of the current picture reaches the entry time. When the time of the current picture reaches the entry time, the picture output device 215 starts converting the decoded moving-picture data into the analog moving-picture signal and feeding the analog moving-picture signal to the monitor 215A. Thus, the monitor 215A visualizes the current picture represented by the analog moving-picture signal. Thereafter, the picture output device 215 continues to convert the decoded moving-picture data into the analog moving-picture signal and feed the analog moving-picture signal to the monitor 215A. Thus, the monitor 215A continues to visualize subsequent pictures represented by the analog moving-picture signal. Accordingly, the picture in the moving-picture stream which is designed by the offset information (the entry_offset_time information) and subsequent pictures therein are sequentially indicated by the monitor 215A. Especially, the indication of the picture in the moving-picture stream which is designed by the offset information accurately and reliably occurs at the first place (the head) in the search playback. On the other hand, the picture output device 215 continues to halt the D/A conversion and the feed of the analog moving-picture signal to the monitor 215A until the time of the current picture reaches the entry time.

The CPU 204 can control the devices 202, 203, and 205-215. The CPU 204 operates in accordance with a control program (a computer program) stored in its internal memory. The control program may be read out from a recording medium before being stored into the memory within the CPU 204. Alternatively, the control program may be downloaded into the memory within the CPU 204 via a communication network.

Figure 23:
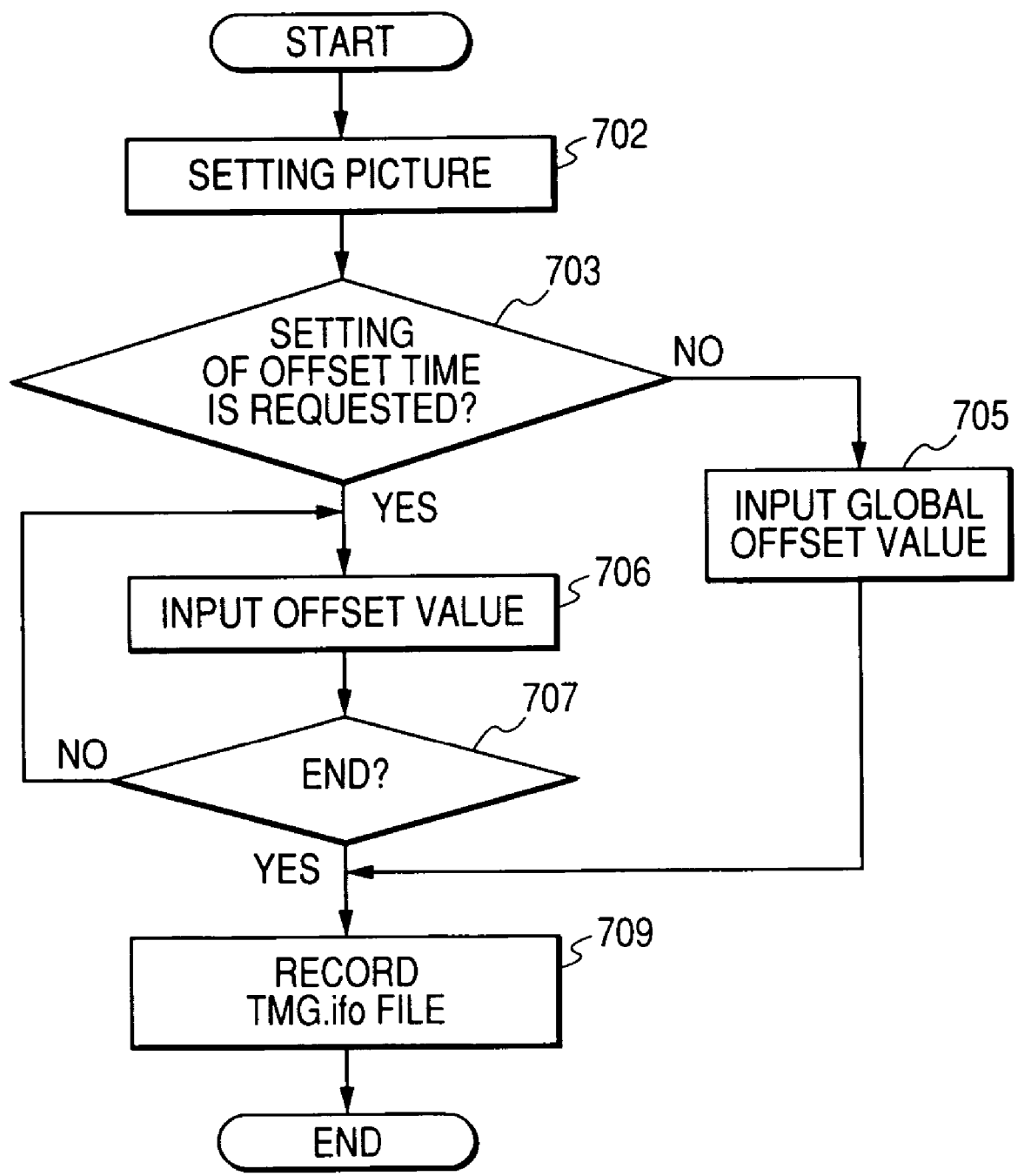
FIG. 23 is a flowchart of a first segment of a control program for a CPU in FIG. 21.

FIG. 23 is a flowchart of a first segment of the computer program which relates to the setting of an entry point or an offset time for each of still pictures. Before the computer program segment in FIG. 23 is started, the TMG.ifo file (the management data) is read out from the recording medium 201 and is then stored in the management data memory 206.

As shown in FIG. 23, a first step 702 of the computer program segment controls the devices 202, 203, 205-209, 211-213, and 215 to indicate the menu picture (see FIG. 22) to the user. The menu picture is also referred to as the offset time setting picture or the entry point setting picture.

A step 703 following the step 702 controls the user interface 203 and the picture output device 215 to superimpose, on the indicated offset time setting picture, a message asking whether or not the user requests the setting of an offset time for each of the still pictures (the index pictures). Generally, the user inputs a user's answer by operating the user interface 203 while monitoring the offset time setting picture. The step 703 receives the user's answer via the user interface 203. On the basis of the user's answer, the step 703 decides whether or not the user requests the setting of an offset time for each of the still pictures. When it is decided that the user requests the setting of an offset time for each of the still pictures, the computer program advances from the step 703 to a step 706. Otherwise, the computer program advances from the step 703 to a step 705.

Generally, the user inputs a desired offset time for each of the still pictures by operating the user interface 203 while monitoring the offset time setting picture.

The step 706 accesses the user interface 203 and waits for the inputting of a desired offset time for selected one of the still pictures. When a desired offset time for selected one of the still pictures is inputted, the step 706 accesses the TMG.ifo file in the management data memory 206 and then writes the desired offset time in the entry_offset_time field of the partial still-picture program information structural body (see FIG. 12) corresponding to the selected still picture. Accordingly, the TMG.ifo file is updated.

A step 707 following the step 706 decides whether or not desired offset times for all the still pictures have been inputted. When it is decided that desired offset times for all the still pictures have been inputted, the computer program advances from the step 707 to a step 709. Otherwise, the step 707 changes or updates the selected still picture from one to another, and then the computer program returns from the step 707 to the step 706.

The step 705 retrieves information representing the global offset time which is preset in the apparatus of FIG. 21. The step 705 accesses the TMG.ifo file in the management data memory 206 and then writes the global offset time in the Global_offset_time field of the GENERAL_IFO (see FIG. 14). Accordingly, the TMG.ifo file is updated. After the step 705, the computer program advances to the step 709.

The step 709 controls the management data memory 206 and the recording medium reader/writer 202 so that the updated TMG.ifo file will be transmitted from the management data memory 206 and will be written over the original TMG.ifo file in the recording medium 201. After the step 709, the current execution cycle of the computer program segment ends.

Figure 24:
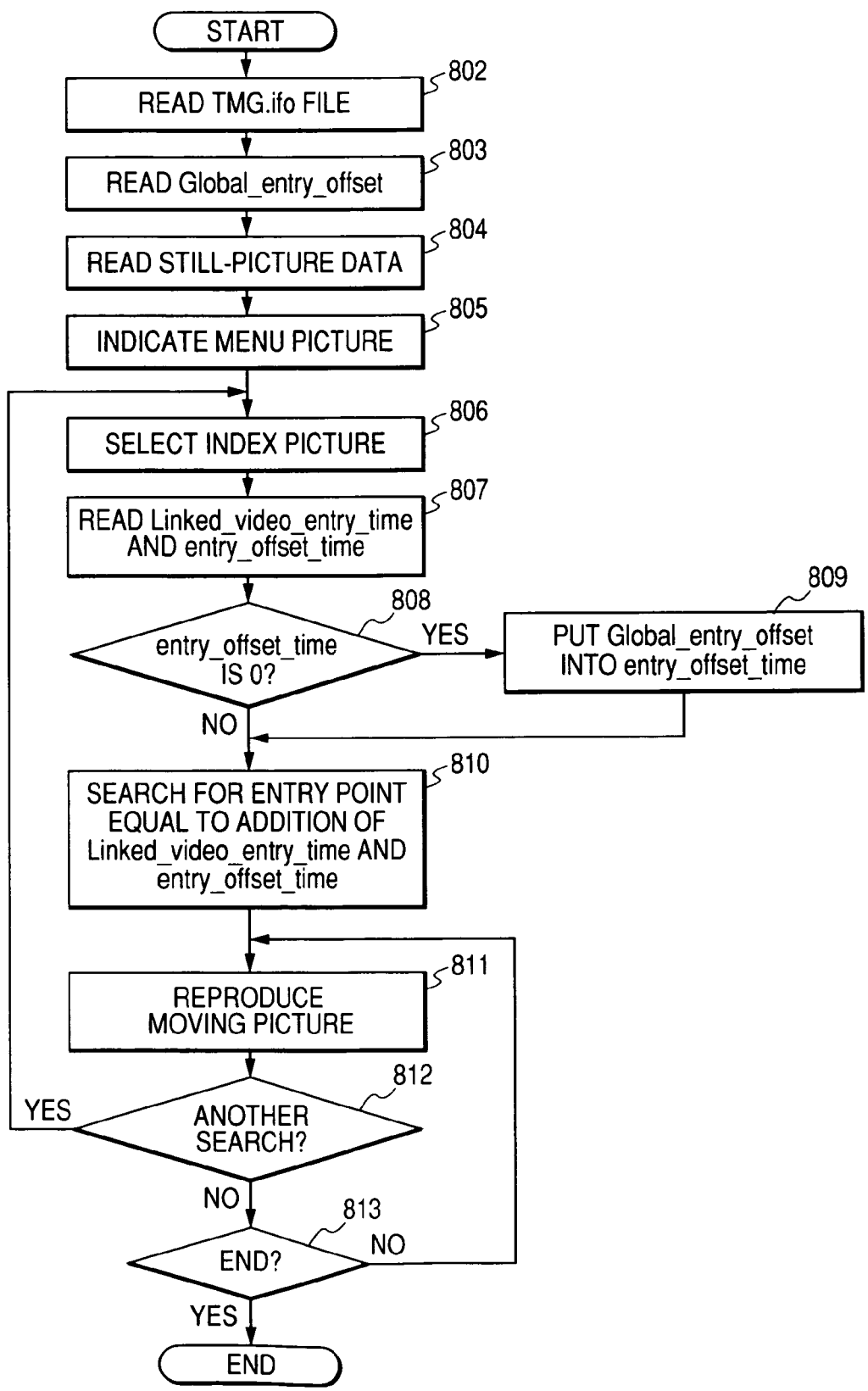
FIG. 24 is a flowchart of a second segment of the control program for the CPU in FIG. 21.

FIG. 24 is a flowchart of a second segment of the computer program for the CPU 204 which relates to playback and search. As shown in FIG. 24, a first step 802 of the computer program segment controls the recording medium reader/writer 202 to read out the TMG.ifo file (the management data) from the recording medium 202. Then, the step 802 controls the recording medium reader/writer 202 and the management data memory 206 so that the read-out TMG.ifo file will be transmitted from the recording medium reader/writer 202 and will be stored into the management data memory 206.

A step 803 following the step 802 accesses the management data memory 206 and reads out the Global_entry_offset information from the GENERAL_IFO (see FIG. 14) in the TMG.ifo file. After the step 803, the computer program advances to a step 804.

The step 804 controls the recording medium reader/writer 202 in response to the TMG.ifo file in the management data memory 206 to read out the still-picture data from the recording medium 201. The step 804 controls the recording medium reader/writer 202, the disc deformatter 205, the demultiplexer 207, and the still-picture decoder 211 so that the read-out still-picture data will be transmitted from the recording medium reader/writer 202 to the still-picture decoder 211 through the disc deformatter 205 and the demultiplexer 207. The step 804 controls the still-picture decoder 211 to decode the still-picture data and feed the decoded still-picture data to the menu picture setter 213.

A step 805 subsequent to the step 804 controls the devices 202, 203, 205-209, 211-213, and 215 to indicate the menu picture (see FIG. 22) to the user. During the control of the devices 202, 203, 205-209, 211-213, and 215, the menu picture setter 213 processes the decoded still-picture data to reduce still pictures into index pictures. Thereby, the menu picture setter 213 generates data representing index pictures which are still pictures reduced from those represented by the decoded still-picture data. The index pictures are located in the indicated menu picture.

A step 806 following the step 805 receives information from the user interface 203 which represents selected one of the index pictures.

A step 807 subsequent to the step 806 accesses the TMG.ifo file in the management data memory 206 and reads out the Linked_video_program_number information, the Linked_video_entry_time information, and the entry_offset_time information from the partial still-picture program structural body (see FIG. 12) corresponding to the selected index picture.

A step 808 following the step 807 decides whether or not the read-out entry_offset_time information corresponding to the selected index picture is "0". When it is decided that the read-out entry_offset_time information is "0", the computer program advances from the step 808 to a step 809. Otherwise, the computer program advances from the step 808 to a step 810.

The step 809 equalizes the contents of the read-out entry_offset_time information to those of the read-out Global_entry_offset information given in the step 803. In other words, the step 809 updates the read-out entry_offset_time information to the read-out Global_entry_offset information. After the step 809, the computer program advances to the step 810.

The step 810 controls the access time setter 208 to identify a moving-picture program to be searched on the basis of the Linked_video_program_number information. The step 810 controls the access time setter 208 to add the value represented by the Linked_video_entry_time information and the value represented by the entry_offset_time information to calculate entry time. The step 810 controls the random access controller 209 to identify a frame (a picture) in the identified moving-picture program which corresponds to the calculated entry time, and which is designated by the entry_offset_time information. The step 810 controls the random access controller 209 to generate a search control signal in response to the calculated entry time and the ID number of the identified moving-picture program. The step 810 controls the random access controller 209 to output the generated search control signal to the recording medium reader/writer 202 and the picture output device 215. The step 810 controls the recording medium reader/writer 202 to respond to the search control signal and to read out, from the recording medium 201, a portion of the moving-picture data which represents the identified frame (the identified picture) in the identified moving-picture program. Then, the step 810 controls the recording medium reader/writer 202 to read out subsequent portions of the moving-picture data. The step 810 controls the recording medium reader/writer 202, the disc deformatter 205, the demultiplexer 207, and the moving-picture decoder 212 so that the read-out moving-picture data will be transmitted from the recording medium reader/writer 202 to the moving-picture decoder 212 through the disc deformatter 205 and the demultiplexer 207. The step 810 controls the moving-picture decoder 212 to decode the moving-picture data and feed the decoded moving-picture data to the picture output device 215. The step 810 controls the picture output device 215 to derive, from the decoded moving-picture data, information of time of every picture (frame) represented by the decoded moving-picture data. The time information is, for example, a time stamp related to every picture. The step 810 controls the picture output device 215 to derive the entry time from the search control signal. The step 810 controls the picture output device 215 to compare the time of the current picture represented by the decoded moving-picture data with the entry time to decide whether or not the time of the current picture reaches the entry time. When the time of the current picture reaches the entry time, the computer program advances from the step 810 to a step 811.

The step 811 controls the picture output device 215 to convert the decoded moving-picture data into an analog moving-picture signal and feed the analog moving-picture signal to the monitor 215A. Thus, the monitor 215A visualizes the current picture represented by the analog moving-picture signal. After the step 811, the computer program advances to a step 812.

The step 812 decides whether or not a search regarding another of the still pictures (the index pictures) is requested by referring to, for example, information from the user interface 203. When it is decided that such a search is requested, the computer program returns from the step 812 to the step 806. Otherwise, the computer program advances from the step 812 to a step 813.

The step 813 decides whether or not the playback of moving pictures should be terminated by referring to, for example, information from the user interface 203. When it is decided that the playback of moving pictures should be terminated, the computer program exits from the step 813 and then the current execution cycle of the computer program segment ends. Otherwise, the computer program returns from the step 813 to the step 811.

The return of the computer program from the step 813 to the step 811 causes the step 811 to be iterated. Accordingly, the picture in the moving-picture stream which is designed by the offset information (the entry_offset_time information) and subsequent pictures therein are sequentially visualized. In other words, the playback of moving pictures (those in the identified moving-picture program) is started from a time point coincident with the entry time.

Fourth Embodiment

An information recording apparatus in a fourth embodiment of this invention is similar to the apparatus of FIG. 15 or the apparatus of FIG. 20 except for points described hereafter.

The recording medium 120 (see FIG. 15 or 20) is of such a type as to allow a random access thereto. The recording medium 120 includes, for example, a hard disc or an optical disc.

The recording medium 120 may be replaced by a data transmission line or a data transmission means utilizing electromagnetic wave or light. Information recorded on the recording medium 120 may be replaced by an electronic file of data which is in an unrecorded state.

Fifth Embodiment

An information reproducing apparatus in a fifth embodiment of this invention is similar to the apparatus of FIG. 21 except for points described hereafter.

The recording medium 201 (see FIG. 21) is of such a type as to allow a random access thereto. The recording medium 201 includes, for example, a hard disc or an optical disc.

The recording medium 201 may be replaced by a data transmission line or a data transmission means utilizing electromagnetic wave or light. Information recorded on the recording medium 201 may be replaced by an electronic file of data which is in an unrecorded state.

Sixth Embodiment

An information sending apparatus in a sixth embodiment of this invention is a modification of the apparatus of FIG. 15 or the apparatus of FIG. 20. The information sending apparatus transmits data instead of recording the data on a recording medium. The transmitted data propagates along a transmission medium such as a communication line or a communication network. The information sending apparatus may broadcast the data.

Seventh Embodiment

An information receiving apparatus in a seventh embodiment of this invention is a modification of the apparatus of FIG. 21. The information receiving apparatus receives data instead of reproducing the data from a recording medium.

Advantages of the Invention

The recording medium 120 or 201 stores recorded data in the format of FIGS. 7-14. The recorded data in the recording medium 120 or 201 includes the data representing a stream of moving pictures, the data representing a still picture or pictures, and the offset information. The offset information represents the time position of an entry point which slightly precedes the time position of a moving-picture frame equal or similar in capture timing to each of the still pictures. Therefore, in the case where a search for the entry point in the moving-picture stream is carried out while the related still picture is used as an index picture, the playback of the moving-picture stream is started from a time position slightly before the time position of the related still picture. The interval between the time position of the entry point and the time position of the related moving-picture frame is referred to as the offset time concerning the related still picture. The offset information can be set to provide a same offset time concerning all the still pictures. Alternatively, the offset information can be set to provide different offset times concerning the respective still pictures. In order to find a picture or pictures showing the occasion for a user's decision to capture the still picture, it is unnecessary for the user to slightly move back the playback start position and then perform the playback after the conduct of the search.

What is claimed is:

1. An information recording apparatus comprising:
   first means for successively capturing pictures and thereby generating moving-picture data representing a stream of moving pictures;
   second means for capturing at least one picture and thereby generating still-picture data representing at least one still picture corresponding in picture capture timing to first one of the moving pictures;
   third means for generating link information representing the correspondence in picture capture timing between the still picture and the first one of the moving pictures;
   fourth means for generating offset information designating a second one of the moving pictures which precedes the first one of the moving pictures by a prescribed time interval;

fifth means for generating correspondence information including a pair of the link information generated by the third means and the offset information generated by the fourth means; and sixth means for recording the moving-picture data generated by the first means the still-picture data generated by the third means, and the correspondence information generated by the fifth means on a recording medium.

2. An information reproducing apparatus for reproducing moving-picture data, still-picture information, and correspondence information from a recording medium which have been recorded by the information recording apparatus of claim 1, the information reproducing apparatus comprising:

first means for reading out the still-picture data from the recording medium;

second means for processing the still-picture data read out by the first means into index-picture data representing at least one index picture which originates from a still picture represented by the still-picture data;

third means for reading out the correspondence information from the recording medium;

fourth means for identifying first one of moving pictures represented by the moving-picture data recorded on the recording medium in response to link information in the correspondence information read out by the third means, wherein the first one of the moving pictures is linked with the still picture from which the index picture originates; and fifth means for finding second one of the moving pictures in response to offset information in the correspondence information read out by the third means, wherein the second one of the moving pictures precedes the first one of the moving pictures by a prescribed time interval.

3. An information reproducing apparatus as recited in claim 2, further comprising:

sixth means for generating new offset information designating a third one of the moving pictures which precedes the first one of the moving pictures and which differs from the second one of the moving pictures; and seventh means for writing the new offset information generated by the sixth means over the old offset information in the correspondence information in the recording medium for updating.

4. A computer with peripheral devices and having a computer program that enables the computer and its peripheral devices to perform the following functions of:

successively capturing pictures and thereby generating moving-picture data representing a stream of moving pictures;

capturing at least one picture and thereby generating still-picture data representing at least one still picture corresponding in picture capture timing to first one of the moving pictures;

generating link information representing the correspondence in picture capture timing between the still picture and the first one of the moving pictures;

generating offset information designating a second one of the moving pictures which precedes the first one of the moving pictures by a prescribed time interval;

generating correspondence information including a pair of the generated link information and the generated offset information; and recording the generated moving-picture data, the generated still-picture data, and the generated correspondence information on a recording medium.

5. A computer with peripheral devices and having a computer program that enables the computer and its peripheral devices to perform the following functions of:

reading out still-picture data from a recording medium;

processing the read-out still-picture data into index-picture data representing at least one index picture which originates from a still picture represented by the read-out still-picture data;

reading out correspondence information from the recording medium;

identifying first one of moving pictures represented by moving-picture data recorded on the recording medium in response to link information in the read-out correspondence information, wherein the first one of the moving pictures is linked with the still picture from which the index picture originates; and finding second one of the moving pictures in response to offset information in the read-out correspondence information, wherein the second one of the moving pictures precedes the first one of the moving pictures by a prescribed time interval.

6. A computer as recited in claim 5, wherein the computer program enables the computer and its peripheral devices to further perform the following functions of:

generating new offset information designating a third one of the moving pictures which precedes the first one of the moving pictures and which differs from the second one of the moving pictures; and writing the generated new offset information over the old offset information in the correspondence information in the recording medium for updating.

7. A method comprising the steps of:

successively capturing pictures and thereby generating moving-picture data representing a stream of moving pictures;

capturing at least one picture and thereby generating still-picture data representing at least one still picture corresponding in picture capture timing to first one of the moving pictures;

generating link information representing the correspondence in picture capture timing between the still picture and the first one of the moving pictures;

generating offset information designating a second one of the moving pictures which precedes the first one of the moving pictures by a prescribed time interval;

generating correspondence information including a pair of the generated link information and the generated offset information; and recording the generated moving-picture data, the generated still-picture data, and the generated correspondence information on a recording medium.

8. A method comprising the steps of:

reading out still-picture data from a recording medium;

processing the read-out still-picture data into index-picture data representing at least one index picture which originates from a still picture represented by the read-out still-picture data reading out correspondence information from the recording medium;

identifying first one of moving pictures represented by moving-picture data recorded on the recording medium in response to link information in the read-out correspondence information, wherein the first one of the moving pictures is linked with the still picture from which the index picture originates; and finding second one of the moving pictures in response to offset information in the read-out correspondence information, wherein the second one of the moving pictures precedes the first one of the moving pictures by a prescribed time interval.

9. A method as recited in claim 8, further comprising the steps of:
generating new offset information designating a third one of the moving pictures which precedes the first one of the moving pictures and which differs from the second one of the moving pictures; and
writing the generated new offset information over the old offset information in the correspondence information in the recording medium for updating.

* * * * *